United States Patent
Ichihashi

(10) Patent No.: US 9,671,540 B2
(45) Date of Patent: Jun. 6, 2017

(54) POLARIZATION FILTER AND SENSOR SYSTEM

(71) Applicant: FUJIFILM Corporation, Tokyo (JP)

(72) Inventor: Mitsuyoshi Ichihashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/977,017

(22) Filed: Dec. 21, 2015

(65) Prior Publication Data

US 2016/0109630 A1    Apr. 21, 2016

Related U.S. Application Data

(63) Continuation of application No. PCT/JP2014/066372, filed on Jun. 20, 2014.

(30) Foreign Application Priority Data

Jun. 21, 2013 (JP) ................................ 2013-130634

(51) Int. Cl.
*G02B 5/30* (2006.01)
*C09K 19/54* (2006.01)
(Continued)

(52) U.S. Cl.
CPC ............ *G02B 5/3025* (2013.01); *C09K 19/54* (2013.01); *C09K 19/588* (2013.01); *G02B 5/208* (2013.01);
(Continued)

(58) Field of Classification Search
CPC .. G02B 5/3083; G02B 5/3016; G02B 5/3025; G02B 5/305; G02B 27/26; G02B 5/208;
(Continued)

(56) References Cited

U.S. PATENT DOCUMENTS 6,111,700 A * 8/2000 Kobayashi ........... G02B 5/3025
                                                  348/E9.027
6,996,863 B2   2/2006 Kaneko
(Continued)

FOREIGN PATENT DOCUMENTS

JP   2003-96850 A    4/2003
JP   2003-521074 A   7/2003
(Continued)

OTHER PUBLICATIONS

International Preliminary Report on Patentability for PCT/JP2014/066372 completed on Jun. 2, 2015.
(Continued)

*Primary Examiner* — Mark R Gaworecki
(74) *Attorney, Agent, or Firm* — Birch, Stewart, Kolasch & Birch, LLP

(57) ABSTRACT

According to the present invention, there are provided a polarization filter and a sensor system. The polarization filter includes a circularly polarized light-separating layer having a cholesteric liquid crystalline phase fixed therein, in which the circularly polarized light-separating layer is a layer which selectively transmits one of the left-hand circularly polarized light and the right-hand circularly polarized light in the specific wavelength band, a λ/4 phase difference layer for light in the specific wavelength band is disposed on one of the surfaces of the circularly polarized light-separating layer, and the λ/4 phase difference layer includes a first phase difference region and a second phase difference region of which slow axis directions are orthogonal to each other. The sensor system includes the polarization filter, a light source which emits light having a wavelength in the specific wavelength band, and a light-receiving element which can detect light having a wavelength in the specific wavelength band. The polarization filter of the present invention can improve the sensitivity of a sensor system using polarized (Continued)

light, and the sensor system of the present invention has high sensitivity and is extremely cost effective.

20 Claims, 1 Drawing Sheet

(51) Int. Cl.
  *G02B 5/20* (2006.01)
  *C09K 19/58* (2006.01)
  *C09K 19/04* (2006.01)
  *C09K 19/20* (2006.01)
(52) U.S. Cl.
  CPC ........... *G02B 5/305* (2013.01); *G02B 5/3016* (2013.01); *G02B 5/3083* (2013.01); *C09K 2019/0448* (2013.01); *C09K 2019/2078* (2013.01)
(58) Field of Classification Search
  CPC  G02B 5/02; G02B 5/0841; C09K 2019/0448; C09K 19/2021; C09K 19/24; C09K 19/32; C09K 19/321; C09K 19/322; C09K 19/588; C09K 19/601; C09K 2019/0481; C09K 2019/0485; C09K 2019/2078; C09K 2019/326; C09K 2019/3408; C09K 2219/03; C09K 19/54
  USPC ...................................................... 250/338.1
  See application file for complete search history.

(56) References Cited

U.S. PATENT DOCUMENTS

| | | | |
|---|---|---|---|
| 2002/0039156 A1* | 4/2002 | Li ........................... | B82Y 15/00 349/88 |
| 2004/0095531 A1* | 5/2004 | Jiang ...................... | B82Y 15/00 349/115 |
| 2005/0000015 A1 | 1/2005 | Kaneko | |
| 2006/0181769 A1* | 8/2006 | Kumasawa .......... | G03B 21/604 359/449 |
| 2008/0087149 A1* | 4/2008 | Ohashi ................. | G01N 21/958 83/73 |
| 2009/0161521 A1* | 6/2009 | Kamada ............... | G03H 1/0256 369/112.22 |
| 2009/0242834 A1* | 10/2009 | Hoshino ................. | B41M 3/14 252/299.7 |
| 2009/0315988 A1 | 12/2009 | Fukazawa | |
| 2010/0142050 A1* | 6/2010 | Suzuki ................. | G02F 1/0136 359/487.02 |
| 2012/0293734 A1* | 11/2012 | Saneto ................. | G02B 5/3083 349/15 |
| 2013/0083276 A1* | 4/2013 | Iwahashi ................. | B41M 3/06 349/117 |
| 2014/0198272 A1 | 7/2014 | Hamaguchi et al. | |
| 2015/0069128 A1* | 3/2015 | Hoshino ............. | G03H 1/0011 235/457 |

FOREIGN PATENT DOCUMENTS

| | | | | |
|---|---|---|---|---|
| JP | 2008-58270 A | 3/2008 | | |
| JP | 2009-139453 A | 6/2009 | | |
| JP | 2010-113120 A | 5/2010 | | |
| JP | WO 2012091143 A1 * | 7/2012 | .......... | G02B 5/3083 |
| JP | 2012-532939 A | 12/2012 | | |
| JP | 2013-36888 A | 2/2013 | | |
| JP | 2013-83672 A | 5/2013 | | |
| JP | 2013-83940 A | 5/2013 | | |
| WO | WO 01/55960 A1 | 8/2001 | | |
| WO | WO 2011/003846 A1 | 1/2011 | | |

OTHER PUBLICATIONS

International Search Report for PCT/JP2014/066372 mailed on Aug. 12, 2014.
English translation of the International Preliminary Report on Patentability (Forms PCT/IB/338 and PCT/IPEA/409), dated Dec. 23, 2015, for International Application No. PCT/JP2014/066372.
Japanese Office Action for Application No. 2013-130634, dated Nov. 29, 2016, with English language machine translation.

* cited by examiner

POLARIZATION FILTER AND SENSOR SYSTEM

CROSS-REFERENCE TO RELATED APPLICATIONS

This application is a continuation of PCT International Application No. PCT/JP2014/066372 filed on Jun. 20, 2014, which claims priority under 35 U.S.C. §119 (a) to Japanese Patent Applications No. 2013-130634 filed on Jun. 21, 2013, the entire content of which is incorporated herein by reference.

BACKGROUND OF THE INVENTION

1. Field of the Invention

The present invention relates to a polarization filter. Furthermore, the present invention relates to the application of a polarization filter to a light source, a sensor, a sensor system, and the like.

2. Description of the Related Art

A sensor system using polarized light is known in the related art. For example, JP2008-58270A discloses a technique of detecting cracks of a silicon substrate by using a system in which the silicon substrate is irradiated with polarized infrared light through a first linear polarization filter, and the reflected light or the transmitted light from the silicon substrate is received through a second linear polarization filter. The technique utilizes the following mechanism. That is, the reflected light or the transmitted light from a site free of cracks is linearly polarized light, and when such light passes through the second linear polarization filter, the amount of detectable light is reduced unless certain conditions are satisfied. In contrast, due to irregular reflection, the reflected light or the transmitted light from cracks generates detectable light even when passing through the second linear polarization filter. JP2003-96850A discloses an automatic water faucet device which detects a human hand or an object by using infrared light. In the device, erroneous detection is prevented by using first polarization means for transmitting a linear polarization component of emitted infrared light and second polarization means for transmitting a linear polarization component of received infrared light.

JP2013-368888A discloses a technique which uses circularly polarized light in the technique of JP2008-58270A. According to JP2013-368888A, because circularly polarized light is used, a polarization direction of a second linear polarization filter does not need to be adjusted.

SUMMARY OF THE INVENTION

Objects of the present invention are to provide a polarization filter which can improve the sensitivity of a sensor system using polarization and to provide a highly sensitive and cost-effective sensor system which uses polarization.

In order to achieve the aforementioned objects, the inventors of the present invention tried to use, as a circular polarization filter for a sensor system using circularly polarized light, a layer onto which a cholesteric liquid crystalline phase is fixed. This is because the inventors considered that the use of the layer onto which a cholesteric liquid crystalline phase is fixed would make it possible to obtain a cheap and highly durable filter that can cover a wider range of wavelength band compared to a circular polarization filter having, for example, a linear polarizing film and a phase difference film. However, in the process, through the filter containing the cholesteric liquid crystalline phase, light having a sufficient degree of circular polarization was not obtained as theoretically expected, and as a result, the inventors faced a problem in that the light intensity necessary for sensing was reduced. As a result of conducting intensive examinations for solving the problem, the inventors of the present invention obtained knowledge that by laminating a λ/4 phase difference layer on a cholesteric liquid crystal layer, the amount of obtained light necessary for sensing is increased. Furthermore, in order to apply the knowledge to a detection system, the inventors repeated examinations regarding preferable constitutions and completed the present invention.

That is, the present invention provides the following [1] to [12].

[1] A polarization filter including a circularly polarized light-separating layer having a cholesteric liquid crystalline phase fixed therein, in which the circularly polarized light-separating layer is a layer which selectively transmits one of left-hand circularly polarized light and right-hand circularly polarized light in the specific wavelength band, a λ/4 phase difference layer for light in a specific wavelength band is disposed on one of the surfaces of the circularly polarized light-separating layer, and the λ/4 phase difference layer includes a first phase difference region and a second phase difference region of which slow axis directions are orthogonal to each other.

[2] The polarization filter described in [1], in which the λ/4 phase difference layer comes into direct contact with the circularly polarized light-separating layer or directly adheres to the circularly polarized light-separating layer through an adhesive layer.

[3] The polarization filter described in [1] or [2], in which the specific wavelength band is a wavelength band having a width of equal to or greater than 50 nm within a wavelength range of 800 nm to 1,500 nm.

[4] The polarization filter described in any one of [1] to [3], further including a light-blocking layer which blocks light in at least a portion of a wavelength band other than the specific wavelength band.

[5] The polarization filter described in [3], in which the light-blocking layer blocks light in a wavelength band having a width of equal to or greater than 50 nm within a wavelength of 380 nm to 780 nm.

[6] The polarization filter described in any one of [1] to [5], in which the λ/4 phase difference layer is a layer formed of a liquid crystal composition containing a disk-like liquid crystal compound.

[7] The polarization filter described in any one of [1] to [6], in which in the λ/4 phase difference layer, the first phase difference region and the second phase difference region are arranged in the form of stripes.

[8] A sensor system including the polarization filter described in any one of [1] to [7], a light source which emits light having a wavelength in the specific wavelength band, and a light-receiving element which can sense the light having a wavelength in the specific wavelength band.

[9] The sensor system described in [8], in which the light source, the circularly polarized light-separating layer, and the λ/4 phase difference layer are arranged in this order, and the light-receiving element, the circularly polarized light-separating layer, and the λ/4 phase difference layer are arranged in this order.

[10] The sensor system described in [8] or [9], in which the first phase difference region is at the center of an optical path of the light source, and the second phase difference region is at the center of an optical path of light that the light-receiving element receives.

[11] The sensor system described in [10], in which the first phase difference region and the second phase difference region are continuous regions of which the slow axis directions are the same.

[12] The sensor system described in any one of [8] to [11], further including a light-blocking layer between the light source and the circularly polarized light-separating layer and between the light-receiving element and the circularly polarized light-separating layer.

According to the present invention, there are provided a polarization filter which can improve the sensitivity of a detection system using polarized light and a highly sensitive and extremely cost-effective sensor system which uses the filter. If the polarization filter of the present invention is used, it is possible to prevent the reduction of sensitivity that occurs especially at the time of utilizing circularly polarized light, and to avoid the necessity of aligning the polarization direction of the filter. The polarization filter of the present invention has high durability and can withstand being used in a system including an infrared sensor which is irradiated with light in an infrared region at all times.

DESCRIPTION OF THE PREFERRED EMBODIMENTS

Figure 1:
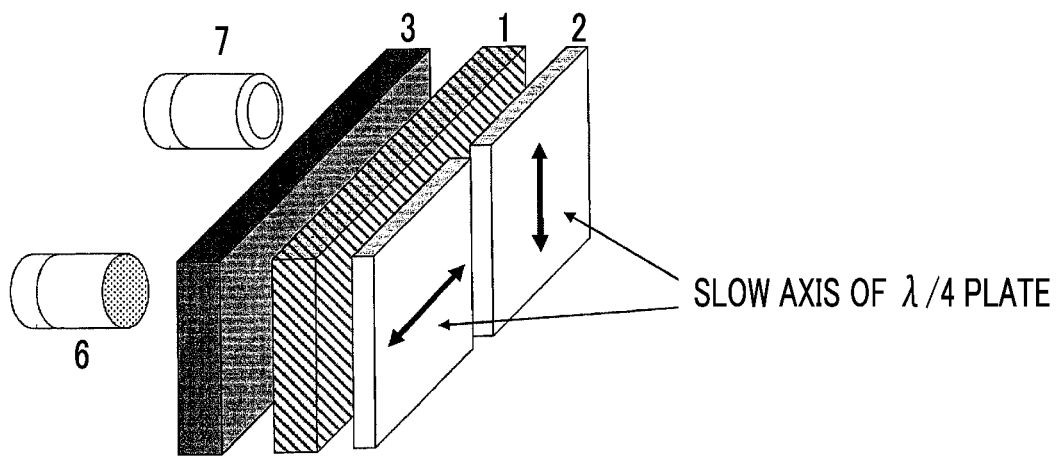
FIG. 1 is a view showing the way the polarization filter of the present invention is used as a sensor system by an example.

Hereinafter, the present invention will be specifically described.

In the present specification, "to" means that the numerical values listed before and after "to" are a lower limit and an upper limit respectively.

In the present specification, a "slow axis" means a direction in which a refractive index is maximized. Unless otherwise specified, the refractive index is a value measured at a wavelength in the region of visible light (λ=550 nm).

In the present specification, the term "selective" relating to circularly polarized light means that the amount of one of the right-hand circular polarization component and the left-hand circular polarization component of radiated light is greater than the amount of the other circularly polarized light. Specifically, when the term "selective" is used, a degree of circular polarization of the light is preferably equal to or greater than 0.3, more preferably equal to or greater than 0.6, even more preferably equal to or greater than 0.8, and still more preferably 1.0 in substance. Herein, provided that the intensity of the right-hand circular polarization component of light is $I_R$, and the intensity of the left-hand circular polarization component of light is $I_L$, the degree of circular polarization is a value represented by $|I_R-I_L|/(I_R+I_L)$. In the present specification, in order to show a ratio between the circular polarization components of light, the degree of circular polarization is used in some cases.

In the present specification, the term "sense" relating to circularly polarized light shows whether the circularly polarized light is right-hand circularly polarized light or left-hand circularly polarized light. According to the sense of circularly polarized light, when an observer looks at light that comes straight toward the observer, a case in which the tip of an electric field vector turns clockwise with the passage of time is defined as right-hand circularly polarized light, and a case in which the tip of an electric field vector turns counterclockwise is defined as left-hand circularly polarized light.

In the present specification, regarding a twisted direction of a helix of a cholesteric liquid crystal, the term "sense" is used in some cases. In selective reflection by the cholesteric liquid crystal, when the twisted direction (sense) of the helix of the cholesteric liquid crystal is right-hand side, the cholesteric liquid crystal reflects right-hand circularly polarized light while transmitting left-hand circularly polarized light. When the sense is left-hand side, the cholesteric liquid crystal reflects left-hand circularly polarized light while transmitting right-hand circularly polarized light.

In the present specification, the light intensity, which is necessary in relation to the calculation of light transmittance, may be measured by using, for example, a general ultraviolet spectrometer, visible spectrometer, or near-infrared spectrometer and using air as a reference.

The polarization state of light at each wavelength can be measured by using a spectral radiance meter or spectrometer equipped with a circular polarization plate. In this case, the intensity of light measured through a right-handed circular polarization plate corresponds to $I_R$, and the intensity of light measured through a left-handed circular polarization plate corresponds to $I_L$. General light sources such as an incandescent bulb, a mercury lamp, a fluorescent lamp, and an LED substantially emit natural light. The characteristics thereof that result in the polarization of a polarization filter or a circularly polarized light-separating layer mounted on those light sources can be measured by using, for example, a polarization phase difference analyzer AxoScan manufactured by Axometrics, Inc.

Furthermore, the characteristics can also be measured by mounting a polarization filter on an illuminometer or an optical spectrometer. By mounting transmission plates for right-hand circularly polarized light and left-hand circularly polarized light on an illuminometer or an optical spectrometer so as to measure the amount of right-hand circularly polarized light and the amount of left-hand circularly polarized light, a ratio between the amounts can be calculated.

(Polarization Filter)

The polarization filter of the present invention has a circularly polarized light-separating layer and a λ/4 phase difference layer. The polarization filter just needs to have the λ/4 phase difference layer on one of the surfaces of the circularly polarized light-separating layer. If necessary, the polarization filter of the present invention may have other layers or other constituent members.

<Optical Properties of Polarization Filter>

The polarization filter is a filter from which linearly polarized light is obtained at one side thereof when natural light (unpolarized light) in a specific wavelength band enters the filter from the other side. The wavelength band (hereinafter, referred to as a "control wavelength band" in some cases) of the light from which the linearly polarized light is obtained by the polarization filter of the present invention is not particularly limited. For example, the light may be within a wavelength band of infrared rays, a wavelength band of visible rays, a wavelength band of ultraviolet rays, wavelength bands of infrared rays and visible rays, wavelength bands of visible rays and ultraviolet rays, or a wavelength band covering the wavelength bands of infrared rays, visible rays, and ultraviolet rays. Particularly, the light is preferably within a wavelength band of near-infrared.

The infrared rays (infrared light) are electromagnetic waves in a wavelength band which is longer than that of visible rays but shorter than that of radio waves. The near-infrared light is electromagnetic waves which are generally in a wavelength band of 700 nm to 2,500 nm. Among electromagnetic waves, the visible rays are light having a wavelength visible to the human eye. The visible rays are in the form of light in a wavelength band of 380 nm to 780 nm. The ultraviolet rays are electromagnetic waves in a wavelength band which is shorter than that of the visible rays but longer than that of X-rays. The ultraviolet rays may be light in a wavelength region which is differentiated from the wavelength region of visible rays and X-rays. For example, the ultraviolet rays are light in a wavelength range of 10 nm to 420 nm.

The control wavelength band may be appropriately selected according to the use of the polarization filter. For example, when the polarization filter is used in a sensor system, the control wavelength band may correspond to the wavelength band of near-infrared light used in an infrared camera, an infrared photoelectric sensor, infrared communication, and the like.

The width of the control wavelength band is not particularly limited. For example, the control wavelength may have such a width that covers the entirety of a wavelength band of any one or more of electromagnetic waves among infrared rays, visible rays, and ultraviolet rays. Alternatively, the width of the control wavelength band may be 1 nm, 10 nm, 50 nm, 100 nm, 150 nm, 200 nm, or the like. The width is preferably about equal to or greater than 50 nm.

In the aforementioned control wavelength band, the polarization filter may have a light transmittance of equal to or greater than 30%, 35%, 40%, 42%, 44%, 45%, 46%, 47%, 48%, or 49%. Preferably, the polarization filter substantially has a light transmittance of 50%.

The optical characteristics of the polarization filter with respect to the light in a wavelength band other than the control wavelength band is limited by a layer (for example, the λ/4 phase difference layer) present in the polarization filter. Except for this, the optical characteristics of the polarization filter are not particularly limited, and preferred characteristics may be imparted to the polarization filter according to the use. For example, when the polarization filter is used in a sensor system, it is preferable that the polarization filter has low light transmittance in at least a portion of the wavelength band other than the control wavelength band in some cases for the following reason. If the polarization filter has low light transmittance as described above, it is possible to greatly reduce the amount of light which reaches the light-receiving element and is unnecessary for sensing (light which hinders sensing) and to reduce the minimum light intensity detected by the light-receiving element by increasing the S/N ratio. At this time, particularly in the wavelength band of the light unnecessary for sensing, the average light transmittance may be equal to or less than 50%, 40%, 30%, 20%, 10%, or 5%.

It is preferable that in the polarization filter, the refractive index changes little in a normal direction and in a direction obliquely passing through in the thickness direction of the polarization filter, and the progress direction of light does not change.

Hereinafter, each of the layers constituting the polarization filter will be described.

(Circularly Polarized Light-Separating Layer)

The circularly polarized light-separating layer has a function of selectively transmitting one of right-hand circularly polarized light and left-hand circularly polarized light in a specific wavelength band. Furthermore, the circularly polarized light-separating layer can separate light (natural light or unpolarized light), which enters the circularly polarized light-separating layer from one side and is in a specific wavelength band, into right-hand circularly polarized light and left-hand circularly polarized light and can selectively transmit one of the lights toward the other side.

The specific wavelength band, in which the circularly polarized light-separating layer selectively transmits one of the right-hand circularly polarized light and the left-hand circularly polarized light, and the width of the specific wavelength band may be the same as those described above for the control wavelength band of the polarization filter. The wavelength band in which the circularly polarized light-separating layer selectively transmits one of the right-hand circularly polarized light and the left-hand circularly polarized light just needs to include a wavelength band of necessary light according to the way the polarization filter is used.

The circularly polarized light-separating layer may transmit, reflect, or absorb light outside the wavelength band in which the circularly polarized light-separating layer selectively transmits one of the right-hand circularly polarized light and the left-hand circularly polarized light.

As the circularly polarized light-separating layer, a layer onto which a cholesteric liquid crystalline phase is fixed may be used.

(Layer onto which Cholesteric Liquid Crystalline Phase is Fixed)

The cholesteric liquid crystalline phase is known to perform selective reflection of circularly polarized light so as to selectively reflect one of the left-hand circularly polarized light and the right-hand circularly polarized light and transmit the other circularly polarized light. Generally, a cholesteric liquid crystal layer can selectively transmit one of the right-hand circularly polarized light and the left-hand circularly polarized light that enter the layer from any surface. In addition, the circularly polarized light-separating layer can separate light, which enters the layer from any surface, into the right-hand circularly polarized light and the left-hand circularly polarized light and can selectively transmit one of the lights toward the other surface.

As films that selectively reflect circularly polarized light, a large number of films formed of a composition containing a polymerizable liquid crystal compound are known in the related art. Regarding the layer onto which the cholesteric liquid crystalline phase is fixed, the techniques in the related art can be referred to.

The layer onto which the cholesteric liquid crystalline phase is fixed may be a layer in which the alignment of a liquid crystal compound in the form of the cholesteric liquid crystalline phase is retained. Typically, the layer onto which the cholesteric liquid crystalline phase is fixed just needs to be formed by aligning a polymerizable liquid crystal compound in the form of the cholesteric liquid crystalline phase, polymerizing and curing the polymerizable liquid crystal compound by ultraviolet irradiation, heating, or the like such that the layer does not exhibit fluidity, and applying an external field or an external force thereto such that the alignment state does not change. Herein, in the layer onto which the cholesteric liquid crystalline phase is fixed, the optical properties of the cholesteric liquid crystalline phase just need to be retained within the layer, and the liquid crystal compound in the layer does not need to keep liquid crystallinity. For example, through a curing reaction, the polymerizable liquid crystal compound may become a polymer and in turn lose liquid crystallinity.

In the present specification, the layer onto which the cholesteric liquid crystalline phase is fixed is referred to as a cholesteric liquid crystal layer or a liquid crystal layer in some cases.

The layer onto which the cholesteric liquid crystalline phase is fixed performs reflection of circularly polarized light due to the helical structure of the cholesteric liquid crystal. A central wavelength $\lambda$ of the reflection depends on a pitch length P (=period of helix) of the helical structure in the cholesteric phase and has a relationship of $\lambda = n \times P$ with an average refractive index n of the cholesteric liquid crystal layer. Therefore, by regulating the pitch length of the helical structure, the wavelength at which the circularly polarized light is reflected can be adjusted. That is, for example, in order to make one of the right-hand circularly polarized light and the left-hand circularly polarized light be selectively transmitted (reflected) in at least a portion of the wavelength band of near-infrared light by regulating the value of n and the value of P, the central wavelength $\lambda$ can be adjusted to be within a wavelength band of 780 nm to 1,500 nm and preferably within a wavelength band of 800 nm to 1,500 nm. Furthermore, in order to make one of the right-hand circularly polarized light and the left-hand circularly polarized light be selectively transmitted (reflected) in at least a portion of the wavelength band of visible light, the central wavelength $\lambda$ can be adjusted to be within a wavelength band of 380 nm to 780 nm. In addition, in order to make one of the right-hand circularly polarized light and the left-hand circularly polarized light be selectively transmitted (reflected) in at least a portion of the wavelength band of ultraviolet light, the central wavelength $\lambda$ can be adjusted to be within a wavelength band of 10 nm to 420 nm and preferably within a wavelength band of 200 nm to 410 nm. The pitch length of the cholesteric liquid crystalline phase depends on the type of a chiral agent used together with the polymerizable liquid crystal compound or the concentration of the chiral agent added. Consequently, by adjusting the type and concentration of the chiral agent, an intended pitch length can be obtained. For measuring the sense or pitch of the helix, it is possible to use the methods described in "Introduction to Experimental Liquid Crystal Chemistry" (edited by The Japanese Liquid Crystal Society, Sigma Publication Ltd, 2007, p. 46) and "Liquid Crystal Handbook" (Editorial Committee of Liquid Crystal Handbook, MARUZEN Co., Ltd. p. 196).

The sense of the circularly polarized light reflected from the cholesteric liquid crystal layer is identical to the sense of the helix. Therefore, as the circularly polarized light-separating layer, a cholesteric liquid crystal layer may be used in which the sense of the helix is either right-handed or left-handed. The circularly polarized light-separating layer may be obtained by laminating two or more layers onto which the cholesteric liquid crystal phase is fixed. At the time of laminating the layers, a plurality of cholesteric liquid crystal layers having the same period P and the same helix sense may be laminated on each other. By laminating the cholesteric liquid crystal layers having the same period P and the same helix sense, the selectivity to circularly polarized light can be improved at a specific wavelength. At the time of laminating the layers, cholesteric liquid crystal layers separately prepared may be laminated on each other by using an adhesive or the like. However, it is preferable to repeat a step of directly coating the surface of a cholesteric liquid crystal layer firstly formed by a method, which will be described later, with a liquid crystal composition containing the polymerizable liquid crystal compound or the like and aligning and fixing the polymerizable liquid crystal compound. By such a step, the alignment orientation of the liquid crystal molecules in the interface on the air interface side of the firstly formed cholesteric liquid crystal layer becomes identical to the alignment orientation of the liquid crystal molecules under a cholesteric liquid crystal layer formed on the firstly formed cholesteric liquid crystal layer. Accordingly, polarization characteristics of the circularly polarized light-separating layer become excellent.

A half-band width $\Delta\lambda$ (nm) of a selective reflection band (reflection band of circularly polarized light) in which the selective reflection of circularly polarized light occurs depends on a birefringence $\Delta n$ of the liquid crystal compound and the pitch length P, and satisfies a relationship of $\Delta\lambda = \Delta n \times P$. Therefore, by adjusting $\Delta n$, the width of the selective reflection band can be controlled. $\Delta n$ can be adjusted by adjusting the type of the polymerizable liquid crystal compound, adjusting a mixing ratio thereof, or controlling the temperature at the time of fixing alignment.

For example, in the region of visible light, when one type of general material is used, the width of the reflection band of circularly polarized light is about 50 nm to 100 nm (because the spectrum of circularly polarized light reflected from the cholesteric liquid crystal layer has a square profile, the "width" is substantially the same as the "half-band width $\Delta\lambda$" in general). In order to widen the control wavelength band, two or more cholesteric liquid crystal layers, which have different periods P and different central wavelengths of the reflected light respectively, may be laminated on each other. At this time, it is also preferable to laminate cholesteric liquid crystal layers having the same helix sense.

Furthermore, in a single cholesteric liquid crystal layer, by gradually changing the period P in the film thickness direction, the control wavelength band can also be widened.

(Method for Preparing Layer onto which Cholesteric Liquid Crystalline Phase is Fixed)

Hereinafter, materials for preparing the cholesteric liquid crystal layer, which can be used in the circularly polarized light-separating layer and a light reflecting layer which will be described layer, and a method for preparing the cholesteric liquid crystal layer will be described.

Examples of the materials used for forming the cholesteric liquid crystal layer include a liquid crystal composition containing a polymerizable liquid crystal compound and a chiral agent (optically active compound). It is possible to form the cholesteric liquid crystal layer by coating a substrate (a support, an alignment film, a cholesteric liquid crystal layer which will be described later, or the like) with the aforementioned liquid crystal composition, into which with a surfactant, a polymerization initiator, or the like is mixed if necessary and which is dissolved in a solvent or the like, aligning and aging the cholesteric liquid crystals, and fixing the cholesteric liquid crystals.

Polymerizable Liquid Crystal Compound

The polymerizable liquid crystal compound may be a rod-like liquid crystal compound or a disk-like liquid crystal compound. However, the polymerizable liquid crystal compound is preferably a rod-like liquid crystal compound.

Examples of the rod-like polymerizable liquid crystal compound forming the cholesteric liquid crystal layer include rod-like nematic liquid crystal compounds. As the rod-like nematic liquid crystal compounds, azomethines, azoxys, cyanobiphenyls, cyanophenylesters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexyl benzonitriles are preferably used. Not only low-molecular weight liquid crystal compounds, but also polymer liquid crystal compounds can be used.

The polymerizable liquid crystal compound can be obtained by introducing a polymerizable group into a liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is particularly preferable. The polymerizable group can be introduced into a molecule of a liquid crystal compound by various methods. The polymerizable liquid crystal compound preferably has 1 to 6 polymerizable groups and more preferably has 1 to 3 polymerizable groups. Examples of the polymerizable liquid crystal compound include the compounds described in Makromol. Chem., vol. 190, p. 2255 (1989), Advanced Materials, vol. 5, p. 107 (1993), U.S. Pat. No. 4,683,327A, U.S. Pat. No. 5,622,648A, U.S. Pat. No. 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), JP2001-328973A, and the like. Two or more kinds of polymerizable liquid crystal compound may be concurrently used. If two or more kinds of polymerizable liquid crystal compound are concurrently used, the alignment temperature can be reduced.

The amount of the polymerizable liquid crystal compound added to the liquid crystal composition is preferably 80% by mass to 99.9% by mass, more preferably 85% by mass to 99.5% by mass, and particularly preferably 90% by mass to 99% by mass with respect to the mass of the solid content of the liquid crystal composition (mass of the solid content of the liquid crystal composition excluding a solvent).

Chiral Agent (Optically Active Compound)

The chiral agent has a function of inducing the helical structure of the cholesteric liquid crystalline phase. Because the sense or pitch of the induced helix varies with the chiral agent, the chiral compound may be selected according to the purpose.

The chiral agent is not particularly limited, and it is possible to use known compounds (for example, those described in Chapter 3, 4-3. <Chiral Agents for TN and STN> in Liquid Crystal Device Handbook, edited by the 142$^{nd}$ Committee of the Japan Society for the Promotion of Science, p. 199, 1989), isosorbide, and isomannide derivatives.

Generally, the chiral agent contains an asymmetric carbon atom. However, an axially asymmetric compound and a planarly asymmetric compound not containing asymmetric carbon atoms can also be used as the chiral agent. Examples of the axially asymmetric compound and the planarly asymmetric compound include binaphthyl, helicene, paracyclophane, and derivatives of these. The chiral agent may have a polymerizable group. When both the chiral agent and the liquid crystal compound have a polymerizable group, by a polymerization reaction between the polymerizable chiral agent and the polymerizable liquid crystal compound, it is possible to form a polymer having a repeating unit derived from the cholesteric liquid crystal compound and a repeating unit derived from the chiral agent. In such an embodiment, the polymerizable group contained in the polymerizable chiral agent is preferably the same type of polymerizable group as the polymerizable group contained in the polymerizable liquid crystal compound. Accordingly, the polymerizable group of the chiral agent is also preferably an unsaturated polymerizable group, an epoxy group, or an aziridinyl group, more preferably an unsaturated polymerizable group, and particularly preferably an ethylenically unsaturated polymerizable group.

Furthermore, the chiral agent may be a liquid crystal compound.

It is preferable that the chiral agent has a photoisomerizing group because a pattern of an intended reflection wavelength corresponding to the emission wavelength can be formed by irradiating the compound with actinic rays through a photomask after coating and alignment. As the photoisomerizing group, an isomerizing site of a compound showing photochromic properties, an azo group, an azoxy group, and a cinnamoyl group are preferable. Specifically, it is possible to use compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

In the liquid crystal composition, the content of the chiral agent is preferably 0.01 mol % to 200 mol % and more preferably 1 mol % to 30 mol % with respect to the amount of the polymerizable liquid crystal compound.

Polymerization Initiator

The liquid crystal composition preferably contains a polymerization initiator. In an embodiment in which a polymerization reaction is caused by ultraviolet irradiation, as the polymerization initiator, it is preferable to use a photopolymerization initiator that can initiate the polymerization reaction by ultraviolet irradiation. Examples of the photopolymerization initiator include an α-carbonyl compound (described in U.S. Pat. No. 2,367,661A and U.S. Pat. No. 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. No. 3,046,127A and U.S. Pat. No. 2,951,758A), a combination of triarylimidazole dimer and p-aminophenylketone (described in U.S. Pat. No. 3,549,376A), acrydine and phenazine compounds (described in JP1985-105667A (JP-S60-105667A) and U.S. Pat. No. 4,239,850A), an oxadiazole compound (described in U.S. Pat. No. 4,212,970A), and the like.

The content of the photopolymerization initiator in the liquid crystal composition is preferably 0.1% by mass to 20% by mass and more preferably 0.5% by mass to 5% by mass, with respect to the content of the polymerizable liquid crystal compound.

Cross-Linking Agent

For the purpose of improving the film strength after curing and improving durability, the liquid crystal composition may optionally contain a cross-linking agent. As the cross-linking agent, those cured by ultraviolet rays, heat, moisture, or the like can be preferably used.

The cross-linking agent is not particularly limited and can be appropriately selected according to the purpose. Examples of the cross-linking agent include a polyfunctional acrylate compound such as trimethylolpropane tri(meth)acrylate or pentaerythritol tri(meth)acrylate; an epoxy compound such as glycidyl (meth)acrylate or ethylene glycol diglycidyl ether; an aziridine compound such as 2,2-bishydroxymethylbutanol-tris[3-(1-aziridinyl)propionate] or 4,4-bis(ethyleneiminocarbonylamino)diphenylmethane; an isocyanate compound such as hexamethylene diisocyanate or biuret-type isocyanate; a polyoxazoline compound having an oxazoline group on a side chain; an alkoxysilane compound such as vinyltrimethoxysilane or N-(2-aminoethyl)3- aminopropyl trimethoxysilane; and the like. Furthermore, depending on the reactivity of the cross-linking agent, a known catalyst can be used. If the catalyst is used, it is possible to improve the productivity in addition to the film strength and durability. One kind of the above cross-linking agent may be used singly, or two or more kinds thereof may be used concurrently.

The content of the cross-linking agent is preferably 3% by mass to 20% by mass, and more preferably 5% by mass to 15% by mass. If the content of the cross-linking agent is less than 3% by mass, the effect of improving cross-linking density is not obtained in some cases. If the content of the cross-linking agent exceeds 20% by mass, the stability of the cholesteric liquid crystal layer is reduced in some cases.

Alignment Control Agent

An alignment control agent, which makes a contribution to stably and rapidly forming a cholesteric liquid crystal layer with a planar alignment, may be added to the liquid crystal composition. Examples of the alignment control agent include fluorine (meth)acrylate-based polymers described in paragraphs [0018] to [0043] of JP2007-272185A, the compounds represented by Formulae (I) to (IV) described in paragraphs [0031] to [0034] in JP2012-203237A, and the like.

One kind of the alignment control agent may be used singly, or two or more kinds thereof may be used concurrently.

The amount of the alignment control agent added to the liquid crystal composition is preferably 0.01% by mass to 10% by mass, more preferably 0.01% by mass to 5% by mass, and particularly preferably 0.02% by mass to 1% by mass, with respect to the total mass of the polymerizable liquid crystal compound.

Other Additives

In addition, the liquid crystal composition may contain at least one kind of component selected from various additives such as a surfactant, which is for uniformizing the film thickness by adjusting the surface tension of the coating film, and a polymerizable monomer. Furthermore, if necessary, within a range that does not deteriorate the optical performance, a polymerization inhibitor, an antioxidant, an ultraviolet absorber, a light stabilizer, a coloring material, metal oxide particles, and the like can be added to the liquid crystal composition.

For obtaining the cholesteric liquid crystal layer, a substrate is coated with the liquid crystal composition, which is obtained by dissolving the polymerizable liquid crystal compound, the polymerization initiator, and the components such as the chiral agent and the surfactant that are added if necessary in a solvent; the liquid crystal composition is dried to obtain a coating film; and the coating film is irradiated with actinic rays so as to polymerize the cholesteric liquid crystalline composition. In this way, a cholesteric liquid crystal layer with fixed cholesteric regularity can be formed. Herein, a laminated film composed of a plurality of cholesteric liquid crystal layers can be formed by repeating the step of producing the cholesteric liquid crystal layer.

The solvent used for preparing the liquid crystal composition is not particularly limited and can be appropriately selected according to the purpose. However, it is preferable to use an organic solvent.

The organic solvent is not particularly limited and can be appropriately selected according to the purpose. Examples of the organic solvent include ketones, alkyl halides, amides, sulfoxides, heterocyclic compounds, hydrocarbons, esters, ethers, and the like. One kind of these organic solvents may be used singly, or two or more kinds thereof may be used concurrently. Among these, considering the load imposed on the environment, ketones are particularly preferable.

The method for coating the substrate with the liquid crystal composition is not particularly limited and can be appropriately selected according to the purpose. Examples of the coating method include a wire bar coating method, a curtain coating method, an extrusion coating method, a direct gravure coating method, a reverse gravure coating method, a die coating method, a spin coating method, a dip coating method, a spray coating method, a slide coating method, and the like. Furthermore, the coating method can be performed by transferring the liquid crystal composition, which has been separately applied onto a support, onto a substrate. By heating the liquid crystal composition with which the substrate is coated, the liquid crystal molecules are aligned. The heating temperature is preferably equal to or less than 200° C., and more preferably equal to or less than 130° C. By the alignment processing, an optical thin film is obtained in which the polymerizable liquid crystal compound is aligned in a twisted state to have a helical axis in a direction that is substantially perpendicular to the plane of the film.

The aligned liquid crystal compound is preferably further subjected to polymerization. The polymerization may be any of thermal polymerization and photopolymerization performed by light irradiation, but is preferably photopolymerization. It is preferable to use ultraviolet rays for the light irradiation. The irradiation energy is preferably 20 mJ/cm$^2$ to 50 J/cm$^2$, and more preferably 100 mJ/cm$^2$ to 1,500 mJ/cm$^2$. In order to accelerate the photopolymerization reaction, the light irradiation may be performed under heating conditions or in a nitrogen atmosphere. The wavelength of the ultraviolet rays for irradiation is preferably 350 nm to 430 nm. From the viewpoint of stability, the rate of the polymerization reaction is preferably high. The rate of the polymerization reaction is preferably equal to or greater than 70%, and more preferably equal to or greater than 80%.

The rate of the polymerization reaction can be determined by analyzing the consumption rate of polymerizable functional groups by using an IR absorption spectrum.

The thickness of the circularly polarized light-separating layer is preferably 1 μm to 150 μm, more preferably 2 μm to 100 μm, and even more preferably 3 μm to 50 μm.

(λ/4 Phase Difference Layer)

The polarization filter of the present invention has a λ/4 phase difference layer. The λ/4 phase difference layer may have a first phase difference region and a second phase difference region of which the slow axis directions are orthogonal to each other. Hereinafter, the "λ/4 phase difference layer having the first phase difference region and the second phase difference region" will be referred to as a "patterned λ/4 phase difference layer" in some cases.

The frontal phase difference of the λ/4 phase difference layer may equal the wavelength within the control wavelength band, and preferably equals ¼ of the central wavelength of the control wavelength band or equals "¼ of central wavelength*n±central wavelength (n is an integer)". For example, if the central wavelength of the control wavelength band is 1,000 nm, a phase difference plate having a phase difference of 250 nm, 750 nm, 1,250 nm, 1,750 nm, or the like can be used as the λ/4 phase difference layer. When the polarization filter of the present invention is used in a sensor system, the phase difference of the λ/4 phase difference layer preferably equals ¼ of the central wavelength of the light emitted from the light source or the central wavelength of the wavelength band of light received by the light-receiving element. Alternatively, the phase difference of the λ/4 phase difference layer preferably equals "¼ of central wavelength*n±central wavelength (n is an integer)". It is preferable that the phase difference has little dependency on the light incidence angle. A phase difference plate having a phase difference that equals ¼ of the central wavelength is most preferably used as the λ/4 phase difference layer.

As long as the frontal phase differences of the first phase difference region and the second phase difference region satisfy the aforementioned conditions, the relationship between the regions is not particularly limited. However, the phase differences of the first and second phase difference regions may be the same as each other.

Herein, the frontal phase difference can be measured by causing the light, which has a wavelength within the control wavelength band, to enter a KOBRA 21ADH or WR (manufactured by Oji Scientific Instruments Co., Ltd.) in the normal direction of the film. In order to select the wavelength for performing the measurement, a wavelength selective filter can be manually changed, or the measured value may be converted by a program or the like.

The λ/4 phase difference layer can be formed by aligning and fixing the polymerizable liquid crystal compound and the polymer liquid crystal compound. The types of the liquid crystal compound used for forming the λ/4 phase difference layer are not particularly limited. For example, it is possible to use an optically anisotropic layer, which is obtained by forming a nematic alignment of a low-molecular weight liquid crystal compound in a liquid crystal state and then fixing the alignment state by means of cross-linking using light or heat, or an optically anisotropic layer which is obtained by forming a nematic alignment of a polymer compound in a liquid crystal state and then fixing the alignment state by means of cooling.

Generally, liquid crystal compounds can be classified into a rod type (rod-like liquid crystal compound) and a disk type (discotic liquid crystal compound) according to the shape thereof. Furthermore, each of rod-like liquid crystal compounds and discotic liquid crystal compounds are classified into a low-molecular weight type and a polymer type. Generally, polymer refers to a compound having a degree of polymerization of equal to or greater than 100 ("Physics of Polymers•Dynamics of Phase Transition", Masao Doi, p. 2, Iwanami Shoten, Publishers, 1992). In the present invention, any liquid crystal compound can be used. However, it is preferable to use a rod-like liquid crystal compound or a discotic liquid crystal compound. Two or more kinds of rod-like liquid crystal compound, two or more kinds of discotic liquid crystal compound, or a mixture of a rod-like liquid crystal compound and a discotic liquid crystal compound may be used.

As a rod-like liquid crystal compound, for example, it is possible to preferably use those described in Claim 1 of JP1999-513019A (JP-H11-513019A) or in paragraphs [0026] to of JP2005-289980A. As a discotic liquid crystal compound, it is possible to preferably use those described in paragraphs [0020] to [0067] of JP2007-108732A or in paragraphs [0013] to [0108] of JP2010-244038A. However, the present invention is not limited thereto.

It is more preferable to form the λ/4 phase difference layer by using a rod-like liquid crystal compound or a discotic liquid crystal compound having a polymerizable group, because the change of temperature or humidity can be reduced. Liquid crystal compounds may be in the form of a mixture of two or more kinds thereof, and in this case, at least one of the liquid crystal compounds preferably has two or more polymerizable groups.

That is, the λ/4 phase difference layer is preferably a layer formed by fixing a rod-like liquid crystal compound or a discotic liquid crystal compound having a polymerizable group by means of polymerization or the like. In this case, after becoming a layer, the liquid crystal compound does not need to exhibit liquid crystallinity.

The type of the polymerizable group contained in the discotic liquid crystal compound and the rod-like liquid crystal is not particularly limited. The polymerizable group is preferably a functional group which can cause an addition polymerization reaction. The polymerizable group is preferably an ethylenically unsaturated polymerizable group or a cyclic polymerizable group. More specifically, examples thereof preferably include a (meth)acryloyl group, a vinyl group, a styryl group, an allyl group, and the like, and among these, a (meth)acryloyl group is more preferable.

As the method for forming the first phase difference region and the second phase difference region of the λ/4 phase difference layer, the following preferred embodiments are exemplified. However, the present invention is not limited thereto, and the λ/4 phase difference layer can be formed by using various known methods.

A first preferred embodiment is a method of utilizing a plurality of actions for controlling the alignment of the liquid crystal compound and then canceling one of the actions by using an external stimulus (thermal processing or the like) such that a predetermined alignment control action becomes predominant. In such a method, for example, the liquid crystal compound is caused to be in a predetermined alignment state by using the composite action of the alignment control ability resulting from the alignment film and the alignment control ability of the alignment control agent added to the liquid crystal compound, and one of the phase difference regions is formed by fixing the alignment state. Thereafter, one of the actions (for example, the action resulting from the alignment control agent) is canceled by an external stimulus (thermal processing or the like), such that the other alignment control action (action resulting from the alignment film) becomes predominant. In this way, the other alignment state is realized, and the other phase difference region is formed by fixing the alignment state. Details of this method are described in paragraphs [0017] to [0029] of JP2012-008170A, the content of which is incorporated in the present specification by reference.

A second preferred embodiment is an embodiment in which patterned alignment films are used. In this embodiment, patterned alignment films having different alignment control abilities are formed, and liquid crystal compounds are disposed thereon and aligned. Due to the alignment control abilities of the respective patterned alignment films, the liquid crystal compounds achieve different alignment states respectively. By fixing the alignment states, patterns of the first and second phase difference regions are formed according to the patterns of the alignment films. The patterned alignment films can be formed by using a printing method, mask rubbing performed on a gravure alignment film, mask exposure performed on a photoalignment film, or the like. It is preferable to use a printing method because this method does not require large-scale facilities and easily produces the patterned alignment films. Details of this method are described in paragraphs [0166] to [0181] of JP2012-032661A, the content of which is incorporated in the present specification by reference.

A third preferred embodiment is an embodiment in which a photoacid generator is added to the alignment film, for example. In this example, a photoacid generator is added to the alignment film, and by pattern exposure, a region in which an acidic compound is generated as a result of decomposition of the photoacid generator and a region in which an acidic compound is not generated are formed. In a portion not irradiated with light, the photoacid generator substantially remains undecomposed, and the interaction between the material of the alignment film, the liquid crystal compound, and the alignment control agent which is added if necessary dominates the alignment state. As a result, the liquid crystal compound is aligned in a direction in which the slow axis thereof becomes orthogonal to the rubbing direction. When the alignment film is irradiated with light, and thus an acidic compound is generated, the aforementioned interaction is no longer predominant. As a result, the rubbing direction of the rubbing alignment film dominates the alignment state, and the liquid crystal compound is put in a parallel alignment state in which the slow axis thereof is parallel to the rubbing direction. As the photoacid generator used in the alignment film, a water-soluble compound is preferably used. Examples of the usable photoacid generator include the compounds described in Prog. Polym. Sci., vol. 23, p. 1485 (1998). As the photoacid generator, a pyridinium salt, an iodonium salt, and a sulfonium salt are particularly preferably used. Details of the method are described in JP2010-289360, the content of which is incorporated in the present specification by reference.

[Polymerization Initiator]

The aligned (preferably vertically aligned) liquid crystal compound is preferably fixed in a state of maintaining the alignment state. The fixing is preferably performed by a polymerization reaction of the polymerizable group, which has been introduced into the liquid crystal compound, by using a polymerization initiator. The polymerization reaction includes a thermal polymerization reaction using a thermal polymerization initiator and a photopolymerization reaction using a photopolymerization initiator. Among these, a photopolymerization reaction is preferable.

The amount of the polymerization initiator used is preferably 0.01% by mass to 20% by mass and more preferably 0.5% by mass to 5% by mass of the solid content of the composition.

[Other Additives]

The uniformity of the coating film, the strength of the film, the alignment properties of the liquid crystal compound, and the like can be improved by concurrently using a plasticizer, a surfactant, a polymerizable monomer, and the like together with the aforementioned liquid crystal compound. It is preferable for these materials to be compatible with the liquid crystal compound and not to hinder the alignment.

Furthermore, in order to put the liquid crystal compound in a horizontal alignment state or the vertical alignment state, additives (alignment control agents) accelerating the horizontal alignment and the vertical alignment may be used. As the additives, various known additives can be used.

Examples of the polymerizable monomer include a radically polymerizable compound and a cationically polymerizable compound. Among these, a radically polymerizable polyfunctional monomer is preferable, and a compound which can be copolymerized with the liquid crystal compound containing the aforementioned polymerizable group is preferable. Examples of such a compound include those described in paragraphs [0018] to [0020] of JP2002-296423A. Generally, the amount of the compound added is preferably within a range of 1% by mass to 50% by mass, and more preferably within a range of 5% by mass to 30% by mass, with respect to the liquid crystal molecules.

Examples of the surfactant include the compounds known in the related art, and particularly, a fluorine-based compound is preferable. Specifically, examples thereof include the compounds described in paragraphs [0028] to [0056] of JP2001-330725A and the compounds described in paragraphs [0069] to [0126] of JP2003-295212.

It is preferable that the polymer used together with the liquid crystal compound can increase the viscosity of the coating solution. Examples of the polymer include a cellulose ester. Preferred examples of the cellulose ester include those described in paragraph [0178] of JP2000-155216A. The amount of the polymer added is preferably within a range of 0.1% by mass to 10% by mass and more preferably within a range of 0.1% by mass to 8% by mass, with respect to the liquid crystal molecules, such that the polymer does not hinder the alignment of the liquid crystal compound.

A discotic nematic liquid crystalline phase-solid phase transition temperature of the liquid crystal compound is preferably 70° C. to 300° C., and more preferably 70° C. to 170° C.

[Coating Solvent]

As the solvent used for preparing the composition (coating solution), an organic solvent is preferably used. Examples of the organic solvent include amides (such as N,N-dimethylformamide), sulfoxides (such as dimethyl sulfoxide), a heterocyclic compound (such as pyridine), hydrocarbons (such as benzene or hexane), alkyl halides (such as chloroform or dichloromethane), an ester (such as methyl acetate, ethyl acetate, or butyl acetate), ketones (such as acetone or methyl ethyl ketone), and an ether (such as tetrahydrofuran or 1,2-dimethoxyethane). Among these, alkyl halides and ketones are preferable. Two or more kinds of organic solvent may be used concurrently.

The first phase difference region and the second phase difference region, of which the slow axis directions are orthogonal to each other and which have substantially the same frontal phase difference, may be continuous or discontinuous with respect to each other. That is, for example, as shown in FIG. 1, the λ/4 phase difference layer may be composed of a continuous first phase difference region and a continuous second phase difference region. Alternatively, the first phase difference region and the second phase difference region may be in the form of stripes in which the first and second phase difference regions alternate with each other. Furthermore, the first phase difference region and the second phase difference region may be present in the form of a Bayer pattern (check pattern).

In addition, the polarization filter of the present invention may be prepared as a long polarization filter in which the first phase difference region and the second phase difference region alternate with each other in the form of stripes, and thereafter, according to the usage embodiment, the polarization filter may be cut into such a size that the polarization filter includes the continuous first phase difference region and the continuous second phase difference region. Herein, the "cut" mentioned herein also includes "punching", "cutting out", and the like.

(Light-Blocking Layer)

The polarization filter may have a light-blocking layer. The light-blocking layer functions to prevent the light outside the control wavelength band from being transmitted through the filter. It is preferable that the light-blocking layer blocks natural light. Furthermore, it is preferable that the light-blocking layer blocks all of unpolarized light, circularly polarized light, and linearly polarized light. Examples of the light-blocking layer include a light reflection layer and a light absorption layer.

The width of the wavelength band of the light reflected from or absorbed into the light-blocking layer is not particularly limited, but may be equal to or greater than 10 nm, 20 nm, 30 nm, 40 nm, 50 nm, or the like. Depending on the use of the polarization filter, the wavelength band of the light reflected from or absorbed into the light-blocking layer preferably includes a wavelength band of unnecessary light. For example, when the polarization filter is used in a sensor, the wavelength band of the light reflected from or absorbed into the light-blocking layer preferably includes a wavelength band in which light unnecessary for sensing (light hindering sensing) is easily detected.

In addition, it is preferable that a difference between the average refractive index (in-plane average refractive index) of the circularly polarized light-separating layer and the refractive index of the light-blocking layer is small in the control wavelength band.

In the case of the polarization filter used in a sensing system, for example, the light-blocking layer may greatly reflect or absorb light in at least a portion of a wavelength band excluding the detection wavelength band of the sensor (light-receiving element) used. Alternatively, the light-blocking layer may greatly reflect or absorb light in at least a portion excluding either the emission wavelength band of the light source used or the light-receiving region of the light-receiving element.

For example, when the polarized light in the near-infrared region is used in a sensor system, a light-blocking layer may be used which greatly reflects or absorbs light in at least a portion of the region of visible light. Generally, a silicon photodiode used as a light-receiving element (photodetector) exhibits sensitivity even in the region of visible light which is the most abundant in the usage environment and becomes a main cause of noise. Therefore, it is preferable that the light-blocking layer reflects or absorbs light mainly in the region of visible light. Furthermore, it is preferable that a visible light-blocking layer substantially does not reflect or absorb light in the wavelength band of near-infrared light in which the circularly polarized light-separating layer selectively transmits one of right-hand circularly polarized light and left-hand circularly polarized light.

The thickness of the light-blocking layer is preferably 2 μm to 500 μm, more preferably 5 μm to 300 μm, and even more preferably 10 μm to 150 μm.

Hereinafter, the light reflection layer and the light absorption layer that can be used as the light-blocking layer will be described.

(Light Reflection Layer)

If the light reflection layer which reflects light is used to block light, the temperature of the film does not increase. Therefore, the durability of the film is improved, and the film performance is easily maintained. Furthermore, generally, the light reflection layer has a mirror-like external appearance. Accordingly, the light reflection layer positively affects the external appearance of the film, and is easily used in a visible portion when being used as a part of a sensor.

Examples of the light reflection layer include a dielectric multilayer film, a film onto which a cholesteric liquid crystalline phase is fixed, and the like.

(Dielectric Multilayer Film)

The dielectric multilayer film is obtained by alternately laminating a large number of transparent dielectric layers composed of an inorganic oxide or an organic polymer material having different refractive indices. At least one of the transparent dielectric layers is constituted such that a product (n×d) of a thickness (d) and a refractive index (n) of the transparent dielectric layer equals ¼ of a wavelength (λ) of the light which should be reflected. Such a layer has a central reflection wavelength of λ, and can reflect the light in a reflection bandwidth which is determined according to the difference in refractive index between the dielectric layers. In many cases, with a combination of general materials, it is difficult to reflect all the light in an intended wavelength band by using a dielectric multilayer film having a single period. Therefore, by laminating dielectric layers of several kinds having different values of n×d and different central wavelengths of reflected light, the reflection bandwidth may be adjusted and widened. The transparent dielectric layer is not particularly limited as long as it transmits light in the control wavelength band.

Generally, as the inorganic oxide in the dielectric multilayer film, $TiO_2$, $SiO_2$, $Ta_2O_5$, or the like can be preferably used. The inorganic oxide layer can be formed by, for example, a sputtering method performed on the surface of glass or a heat-resistant polymer film. Examples of the organic polymer material include polycarbonate, an acrylic resin, polyester, an epoxy resin, polyurethane, polyamide, polyolefin, silicone (including modified silicone such as silicone polyurea), and the like which can be produced based on the method disclosed in JP1997-507308A (JP-H09-507308A).

(Layer onto which Cholesteric Liquid Crystalline Phase is Fixed: Light Reflection Layer)

As the reflection layer, it is possible to use the aforementioned layer onto which the cholesteric liquid crystalline phase is fixed.

The thicker the cholesteric liquid crystal layer, the higher the reflectivity at a reflection wavelength. However, when a general liquid crystal material is used, for example, the reflectivity is saturated at a thickness of 2 μm to 8 μm in a wavelength band of visible light. Furthermore, because the reflection layer reflects only the circularly polarized light on one side, the reflectivity is 50% at most. In order to reflect light regardless of the sense of the circularly polarized light and to increase the reflectivity of natural light to be equal to or greater than 50%, as the light reflection layer, it is possible to use a layer in which a cholesteric liquid crystal layer with right-handed helix sense and a cholesteric liquid crystal layer with left-handed helix sense that have the same period P are laminated, or to use a laminate composed of cholesteric liquid crystal layers which have the same period P and the same helix sense and a phase difference film which is disposed between the cholesteric liquid crystal layers and has a phase difference that equals ½ of the central wavelength of the reflection band of circularly polarized light of the cholesteric liquid crystal layers.

(Light Absorption Layer)

As the light absorption layer, it is possible to use a layer formed by coating a substrate (preferably a substrate which sufficiently transmits light in the wavelength band of infrared rays detected by the light-receiving element) with a dispersion liquid obtained by dispersing a colorant such as a pigment or a dye in a solvent containing a dispersant, a binder, or a monomer, a layer obtained by directly dyeing the surface of a polymer substrate with a dye, or a layer formed of a dye-containing polymer material.

As the pigment, those that does not absorb or scatter light in the control wavelength band of the polarization filter are preferably used. Therefore, it is possible to preferably use cyan, magenta, yellow, and black inks for color printing for which transparency is required or to preferably use pigments used in color filters for red, green, and blue in a liquid crystal display device, an organic LED display device, and the like. By mixing these pigments having different maximum absorption wavelengths together, it is possible to form a layer which sufficiently absorbs a wide range of light in the entirety of an intended wavelength band other then the control wavelength band.

As the dye, those that do not absorb light in the control wavelength band and exhibit fastness with respect to light exposure are preferably used. As such dyes, it is possible to use a general direct dye, an acidic dye, a basic dye, a mordant dye, a disperse dye, a reactive dye, and the like. As the dye-type absorption layer, it is also possible to use commercially available photographic filters IR-80, IR-82, IR-84, and the like (manufactured by FUJIFILM Corporation).

(Other Layers)

The polarization filter may include other layers such as a support, an alignment layer for aligning the liquid crystal compound, and an adhesive layer for bonding the respective layers to each other. It is preferable that all of the aforementioned other layers are transparent and have low birefringence properties.

(Support)

The support is not particularly limited. The support which is used for forming the circularly polarized light-separating layer or the λ/4 phase difference layer may be a temporary support that is peeled off after the circularly polarized light-separating layer is formed. When the support is a temporary support, it is not used as a layer constituting the polarization filter. Therefore, the optical characteristics thereof such as transparency or refractivity described above are not particularly limited.

As the support (temporary support), a plastic film, glass, and the like may be used. Examples of the plastic film include polyester such as polyethylene terephthalate (PET), polycarbonate, an acrylic resin, an epoxy resin, polyurethane, polyamide, polyolefin, a cellulose derivative, silicone, and the like.

(Alignment Film)

The surface of the alignment film may be coated with each of a composition for forming a λ/4 phase difference layer and a composition for forming a cholesteric liquid crystal layer such that the molecules of the liquid crystal compound in the composition are aligned. The alignment film has a function of specifying the alignment direction of the liquid crystal compound. Therefore, it is preferable to use the alignment film for realizing preferred alignment state in some cases. The alignment film can be provided by means of rubbing processing of an organic compound (preferably a polymer), oblique vapor deposition of an inorganic compound, formation of a layer having microgrooves, or accumulation of an organic compound (for example, ω-tricosanoic acid, dioctadecylmethylammonium chloride, or methyl stearate) by a Langmuir-Blodgett method (LB film) Furthermore, an alignment film is also known which obtains an alignment function by the application of an electric field or a magnetic field or by being irradiated with light (preferably polarized light).

Examples of the polymer include a methacrylate-based copolymer, a styrene-based copolymer, a polyolefin, polyvinyl alcohol, and a modified polyvinyl alcohol described in paragraph [0022] of JP1996-338913A (JP-H08-338913A), poly(N-methylolacrylamide), polyester, polyimide, a vinyl acetate copolymer, carboxymethyl cellulose, polycarbonate, polyarylate, polyamideimide, polyetherimide, polyamide, modified polyamide, and the like. A silane coupling agent can be used as the polymer. As the polymer, a water-soluble polymer (such as poly(N-methylolacrylamide), carboxymethyl cellulose, gelatin, polyvinyl alcohol, and modified polyvinyl alcohol) are preferable, gelatin, polyvinyl alcohol, and modified polyvinyl alcohol are more preferable, and polyvinyl alcohol and modified polyvinyl alcohol are most preferable.

Basically, the alignment film can be formed by coating a transparent support with a solution, which contains the aforementioned polymer as a material for forming the alignment film and optional additives (for example, a cross-linking agent), then drying (cross-linking) the solution by heating, and performing rubbing processing.

As the rubbing processing, it is possible to use a processing method which is widely adopted as a step of liquid crystal alignment processing of LCD. That is, it is possible to use a method of obtaining alignment by rubbing the surface of the alignment film with paper, gauze, felt, rubber, nylon, polyester fiber, or the like in a certain direction. Generally, the rubbing processing is performed by rubbing the surface of the alignment film approximately several times with a cloth or the like in which fibers having uniform length and thickness are evenly flocked.

The surface of the support which is not provided with the alignment film or the surface of the support which has undergone the rubbing processing may be coated with the liquid crystal composition.

(Adhesive Layer)

The adhesive layer may be formed of an adhesive.

According to the curing method, the adhesive is classified into a hot-melt type, a thermosetting type, a photocurable type, a reaction-curable type, and a pressure-sensitive type adhesive which does not require curing. As the material of these adhesives, it is possible to use compounds based on acrylate, urethane, urethane acrylate, epoxy, epoxy acrylate, polyolefin, modified olefin, polypropylene, ethylene vinyl alcohol, vinyl chloride, chloroprene rubber, cyanoacrylate, polyamide, polyimide, polystyrene, polyvinyl butyral, and the like. From the viewpoint of workability and productivity, photocuring is preferable as the curing method. From the viewpoint of optical transparency and heat resistance, as the material, it is preferable to use compounds based on acrylate, urethane acrylate, epoxy acrylate, and the like.

(Use of Polarization Filter)

The use of the polarization filter is not particularly limited, and the polarization filter can be used in a light source device, a sensor, an optical member, a projector, and the like. The polarization filter of the present invention can be used as a sensor system by being combined with the light source and the light-receiving element.

At the time of using the polarization filter, it is preferable for the polarization filter to be disposed such that the light source, the circularly polarized light-separating layer, and the λ/4 phase difference layer are arranged in this order, and the light-receiving element, the circularly polarized light-separating layer, and the λ/4 phase difference layer are arranged in this order. When the polarization filter has the light-blocking layer, the light-blocking layer may be on the side of the circularly polarized light-separating layer or on the side of the λ/4 phase difference layer. However, it is preferable for the light-blocking layer to be on the side of the circularly polarized light-separating layer.

(Detection of Object)

The wavelength band of light used in the sensor system is not particularly limited. However, it is preferable to use infrared rays, particularly, light in the wavelength band of near-infrared light. If polarized infrared light is used for sensing (detection), in a case in which the reflected light and the transmitted light from an object are detected through a film that selectively transmits polarized light, the optical properties of the object can be reflected as a comparison to the background. Consequently, it is possible to detect an object having specific optical properties or to detect an object with a small degree of malfunctioning. Furthermore, if the λ/4 phase difference layer is used which has the first phase difference region and the second phase difference region of which the slow axis directions are orthogonal to each other, unlike the case in which linearly polarized light is used as polarized light without using the λ/4 phase difference layer, the orientation of a filter for detecting polarized light does not need to be adjusted. Herein, in the present specification, by definition, the "reflected light and transmitted light" include scattered light and diffracted light. The polarization filter of the present invention is preferably used in an embodiment in which the reflected light is used. Examples of the object that can be detected by the sensor system includes cracks or scratches on a transparent (birefringent) film or a specular reflector (such as a metal plate), foreign substances on a specular reflector, and the like. Furthermore, for example, for security purposes, the sensor system can also be used as a human presence detection sensor for detecting human beings such as pedestrians at night or as a motion sensor in automatic doors or elevators.

(Use of Polarization Filter in Sensor System)

FIG. 1 shows an example of the way the polarization filter of the present invention is used in a sensor system.

In the system shown in FIG. 1, one sheet of the polarization filter of the present invention is used, and the light source and the light-receiving element are arranged on one side of the polarization filter such that the light source, the circularly polarized light-separating layer, and the λ/4 phase difference layer are arranged in this order, and the light-receiving element, the circularly polarized light-separating layer, and the λ/4 phase difference layer are arranged in this order. The λ/4 phase difference layer in the polarization filter is composed of the first phase difference region and the second phase difference region of which the slow axis directions are orthogonal to each other. The light source and the light-receiving element are arranged such that light from the light source passes through one of the regions, and the light, which has passed through one of the regions and then is reflected from an object, passes through the other region. The polarization filter used in the system shown in FIG. 1 has the light absorption layer on the uppermost surface thereof which is on the side of the light source and the light-receiving element.

It is preferable that a light-blocking layer, which is not shown in FIG. 1, is provided between the light source and the light-receiving element such that the light from the light source is not detected by the light-receiving element. As the light-blocking layer provided herein, it is possible to use a light-blocking layer which is prepared in the same manner as used for the aforementioned light-blocking layer usable in the polarization filter by using the same material as used for the aforementioned light-blocking layer. It is preferable that the light-blocking layer provided between the light source and the light-receiving element blocks light in a wavelength band including the light in the control wavelength band.

(Light-Receiving Element)

The light-receiving element includes a photodiode-type sensor using a semiconductor such as Si, Ge, HgCdTe, PtSi, InSb, or PbS, a detector in which photodetection elements are linearly arranged, and a CCD or CMOS for capturing images.

In the system using the polarization filter of the present invention, it is preferable to use a light-receiving element which can detect light having a wavelength in the aforementioned control wavelength band.

The polarization filter can be disposed on, for example, a light-receiving surface of the sensor.

When the polarization filter and the light-receiving element are used as an integrated sensor, it is preferable to adopt a constitution in which the sensor has the light-receiving element inside the housing thereof, and the polarization filter is disposed in a light capturing portion, such that light other than the light passing through the polarization filter does not reach the light-receiving element. Furthermore, the sensor preferably includes the light-receiving element, the circularly polarized light-separating layer, and the λ/4 phase difference layer in this order. When the sensor has the light-blocking layer, the light-blocking layer may be on the side of the light-receiving element or on the outside when viewed from the circularly polarized light-separating layer. However, it is preferable that the light-blocking layer is on the side of the light-receiving element.

(Light Source and Light Source Device)

As the light source, a light source may be used which can emit light having a wavelength in the aforementioned control wavelength band. It is possible to use any of light sources, such as a halogen lamp, a tungsten lamp, an LED, an LD, a xenon lamp, and a metal halide lamp, as long as they emit light having a wavelength detected by the light-receiving element. However, in view of compactness, directivity of emission, monochromic light, and suitability for pulse modulation, an LED or LD is preferable.

When the light source and the polarization filter are combined with each other to constitute a light source device, for example, it is preferable to adopt a constitution in which the light source device has the light source inside the housing thereof, and the polarization filter is disposed in a light emitting portion, such that light other than the light passing through the polarization filter is not emitted from the light source. Furthermore, the light source device preferably includes the light source, the circularly polarized light-separating layer, and the λ/4 phase difference layer in this order. When the light source device has the light-blocking layer, the light-blocking layer may be on the side of the light-receiving element or on the outside when viewed from the circularly polarized light-separating layer. However, it is preferable that the light-blocking layer is on the side of the light source.

EXAMPLES

Hereinafter, the present invention will be more specifically described by illustrating examples. The materials, reagents, amounts and proportion of substances, operations, and the like described in the following examples can be appropriately changed within a range that does not depart from the gist of the present invention. Accordingly, the scope of the present invention is not limited to the following examples.

Example 1

The rubbing-processed surface of PET manufactured by FUJIFILM Corporation that had undergone rubbing processing was coated with a coating solution A-2 shown in Table 1 at room temperature by using a wire bar such that the thickness of the film obtained after drying became 5 μm. The coating layer was dried for 30 seconds at room temperature and then heated for 2 minutes in an atmosphere with a temperature of 85° C. Thereafter, by using a D bulb (lamp of 90 mW/cm) manufactured by Fusion UV Systems Inc., the coating layer was irradiated with UV rays for 6 to 12 seconds at 30° C. at 60% of output, thereby obtaining a liquid crystal layer. The liquid crystal layer was coated with a coating solution A-3 shown in Table 1 at room temperature such that the thickness of the film obtained after drying became 5 μm. Subsequently, drying, heating, and UV irradiation were performed on the coating solution in the same manner as described above so as to form a second liquid crystal layer, thereby obtaining a circularly polarized light-separating layer.

As a visible light absorption layer, IR80 manufactured by FUJIFILM Corporation was coated with a LW-curable adhesive Exp. U12034-6 manufactured by DIC Corporation at room temperature by using a wire bar such that the thickness of the film obtained after drying became 5 μm. The coating surface was bonded to the surface of the liquid crystal layer of the circularly polarized light-separating layer prepared above while taking care not to allow air bubbles to get in between the surfaces. Thereafter, by using a D bulb (lamp of 90 mW/cm) manufactured by Fusion UV Systems Inc., the resultant was irradiated with UV rays for 6 to 12 seconds at 30° C. at 60% of output, and then the PET manufactured by FUJIFILM Corporation that had functioned as a support of the circularly polarized light-separating layer was peeled off.

(Formation of Patterned λ/4 Phase Difference Layer)

An alignment film coating solution 1 having the following composition was prepared and filtered through a polypropylene filter having a pore size of 0.2 μm. Thereafter, a cellulose acylate film having undergone alkaline saponification processing was continuously coated with the coating solution by using a #8 wire bar. By using hot air with a temperature of 100° C., the coating solution was dried for 2 minutes, thereby obtaining an alignment film 1 having a thickness of 0.6 μm.

Composition of Alignment Film Coating Solution 1

| | |
|---|---|
| Polyvinyl alcohol PVA-103 (manufactured by KURARAY CO., LTD.) | 4 parts by mass |
| The following photoacid generator | 0.1 parts by mass |
| Water | 70 parts by mass |
| Methanol | 30 parts by mass |

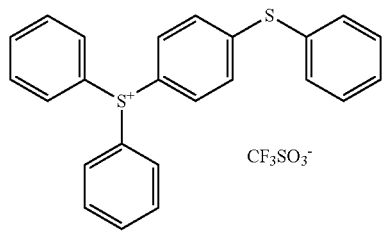

Then, a lattice mask, in which an opening portion with sides of 50 mm×10 mm and a non-opening portion were periodically formed at a pitch of 20 mm, was disposed on the alignment film 1, such that the direction in which the opening portion and the non-opening portion repeated became perpendicular to the longitudinal direction of the film. In a state in which the film was being transported at a velocity of 5 m/min in the longitudinal direction of the film, by using an air-cooled metal halide lamp (manufactured by EYE GRAPHICS Co., Ltd.) having an illuminance of 2.5 mW/cm$^2$ in a UV-C region, the film was irradiated with ultraviolet rays through the lattice mask at room temperature, thereby periodically forming a UV-irradiated portion and a non-irradiated portion. Subsequently, rubbing processing was continuously performed on the film. At this time, the longitudinal direction of the long film was parallel to the transport direction, and the longitudinal direction of the film and the rubbing direction were regulated to be parallel to each other.

Then, the alignment film 1 prepared as described above was coated with the following coating solution (DLC (1)) containing a discotic liquid crystal compound by using a #3 wire bar. The transport velocity (V) of the film was 5 m/min. In order to dry the solvent of the coating solution and to align and age the discotic liquid crystal compound, the coating solution was heated for 2 minutes by using hot air with a temperature of 110° C. Thereafter, in a nitrogen atmosphere, the coating solution was irradiated with UV rays (500 mJ/cm$^2$) at 80° C., thereby fixing the alignment state of the liquid crystal compound. In the portion (first phase difference region) exposed to light through the lattice mask within the alignment film 1, the discotic liquid crystal was vertically aligned in a state in which the slow axis direction was parallel to the rubbing direction. In the unexposed portion (second phase difference region) within the alignment film 1, the discotic liquid crystal was vertically aligned in a state in which the slow axis direction was orthogonal to the rubbing direction. The thickness of the λ/4 phase difference layer was 1.6 μm in both the exposed portion and the unexposed portion. Furthermore, Re (880) at 880 nm was 220 nm in both of the regions.

Composition of Coating Solution (DLC (1))

| | |
|---|---|
| Liquid crystal compound A | 100 parts by mass |
| Irgacure 907 (Ciba Specialty Chemicals Inc.) as initiator | 3 parts by mass |
| Kayacure DETX (manufactured by Nippon Kayaku Co., Ltd.) as sensitizer | 1 part by mass |
| Compound B as alignment aid | 3 parts by mass |
| Methyl ethyl ketone (MEK) as solvent Solid content concentration | 23% by mass |

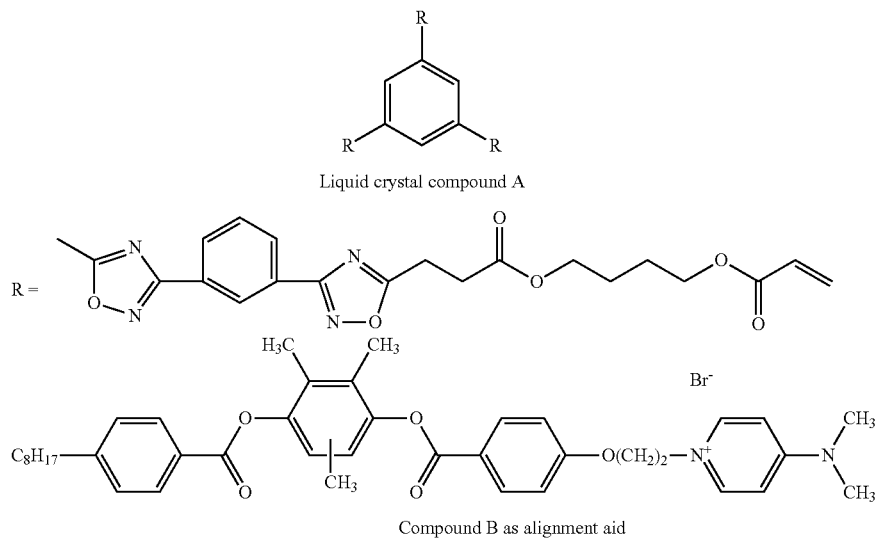

The circularly polarized light-separating layer with a visible light absorption layer prepared as described above was coated with a UV-curable adhesive Exp. U12034-6 manufactured by DIC Corporation at room temperature by using a wire bar, such that the thickness of the film obtained after drying became 5 μm. The coating surface was bonded to the surface of the liquid crystal layer of the patterned λ/4 phase difference layer prepared as described above while taking care not to cause air bubbles to get in between the surfaces. Thereafter, by using a D bulb (lamp of 90 mW/cm) manufactured by Fusion UV Systems Inc., the resultant was irradiated with UV rays for 6 to 12 seconds at 30° C. at 60% of output. Subsequently, the cellulose acylate film that had functioned as a support of the patterned λ/4 phase difference layer was peeled off, thereby obtaining a polarization filter of Example 1.

Example 2

The rubbing-processed surface of PET manufactured by FUJIFILM Corporation that had undergone rubbing processing was coated with a coating solution A-1 shown in Table 1 at room temperature by using a wire bar, such that the thickness of the film obtained after drying became 5 μm. The coating layer was dried for 30 seconds at room temperature and then heated for 2 minutes in an atmosphere with a temperature of 85° C. Thereafter, by using a D bulb (lamp of 90 mW/cm) manufactured by Fusion UV Systems Inc., the coating layer was irradiated with UV rays for 6 to 12 seconds at 30° C. at 60% of output, thereby obtaining a liquid crystal layer. The liquid crystal layer was coated with the coating solution A-2 shown in Table 1 at room temperature such that the thickness of the film obtained after drying became 5 μm. Subsequently, drying, heating, and UV irradiation were performed on the coating solution in the same manner as described above, thereby obtaining a second liquid crystal layer. The second liquid crystal layer was coated with the coating solution A-3 shown in Table 1 at room temperature such that the thickness of the film obtained after drying became 5 μm. Then drying, heating, and UV irradiation were performed on the coating solution in the same manner as described above so as to form a third liquid crystal layer, thereby forming a circularly polarized light-separating layer.

A polarized light-separating filter of Example 2 was obtained in the same manner as in Example 1, except that the circularly polarized light-separating layer prepared as described above was used.

Example 3

The rubbing-processed surface of PET manufactured by FUJIFILM Corporation that had undergone rubbing processing was coated with the coating solution A-1 shown in Table 1 at room temperature by using a wire bar, such that the thickness of the film obtained after drying became 5 μm. The coating layer was dried for 30 seconds at room temperature and then heated for 2 minutes in an atmosphere with a temperature of 85° C. Thereafter, by using a D bulb (lamp of 90 mW/cm) manufactured by Fusion UV Systems Inc., the coating layer was irradiated with UV rays for 6 to 12 seconds at 30° C. at 60% of output, thereby obtaining a liquid crystal layer. The liquid crystal layer was coated with the coating solution A-2 shown in Table 1 at room temperature such that the thickness of the film obtained after drying became 5 μm. Subsequently, drying, heating, and UV irradiation were performed on the coating solution in the same manner as described above, thereby obtaining a second liquid crystal layer. By using each of the coating solutions A-3 to A-9 shown in Table 1, the third to ninth liquid crystal layers were formed on the second liquid crystal layer through the same process as described above, thereby obtaining a circularly polarized light-separating layer.

Preparation of Visible Light Reflection Layer

The rubbing-processed surface of PET manufactured by FUJIFILM Corporation that had undergone the rubbing processing was coated with a coating solution B-1 shown in Table 2 at room temperature by using a wire bar, such that the thickness of the film obtained after drying became 2 μm. The coating layer was dried for 30 seconds at room temperature and then heated for 2 minutes in an atmosphere with a temperature of 85° C. Thereafter, by using a D bulb (lamp of 90 mW/cm) manufactured by Fusion UV Systems Inc., the coating layer was irradiated with UV rays for 6 to 12 seconds at 30° C. at 60% of output, thereby obtaining a liquid crystal layer. The liquid crystal layer was coated with a coating solution B-2 shown in Table 2 at room temperature such that the thickness of the film obtained after drying became 2 μm. Subsequently, drying, heating, and UV irradiation were performed on the coating solution in the same manner as described above, thereby forming a second liquid crystal layer. By using each of the coating solutions B-3 to B-16 shown in Table 2, the third to sixteenth liquid crystal layers were formed on the second liquid crystal layer through the same process as described above, thereby obtaining a visible light reflection layer.

The surface of the liquid crystal layer of the circularly polarized light-separating layer prepared as described above was coated with a UV-curable adhesive Exp. U12034-6 manufactured by DIC Corporation at room temperature by using a wire bar, such that the thickness of the film obtained after drying became 5 μm. The coating surface was bonded to the surface of the liquid crystal layer of the visible light reflection layer prepared as described above while taking care not to cause air bubbles to get in between the surfaces. Thereafter, by using a D bulb (lamp of 90 mW/cm) manufactured by Fusion UV Systems Inc., the resultant was irradiated with UV rays for 6 to 12 seconds at 30° C. at 60% of output. Then, PET manufactured by FUJIFILM Corporation that had functioned as a support of the circularly polarized light-separating layer and the visible light reflection layer was peeled off. The circularly polarized light-separating layer was coated with a UV-curable adhesive Exp. U12034-6 manufactured by DIC Corporation at room temperature by using a wire bar, such that the thickness of the film obtained after drying became 5 μm. The coating surface was bonded to the surface of the liquid crystal layer of the patterned λ/4 phase difference layer prepared as described above while taking care not to cause air bubbles to get in between the surfaces. Thereafter, by using a D bulb (lamp of 90 mW/cm) manufactured by Fusion UV Systems Inc., the resultant was irradiated with UV rays for 6 to 12 seconds at 30° C. at 60% of output. Subsequently, the cellulose acylate film that had functioned as a support of the patterned λ/4 phase difference layer was peeled off, thereby obtaining a polarization filter of Example 3.

Example 4

The rubbing-processed surface of PET manufactured by FUJIFILM Corporation that had undergone rubbing processing was coated with the coating solution A-1 shown in Table 1 at room temperature by using a wire bar, such that the thickness of the film obtained after drying became 5 μm. The coating layer was dried for 30 seconds at room temperature and then heated for 2 minutes in an atmosphere with a temperature of 85° C. Thereafter, by using a D bulb (lamp of 90 mW/cm) manufactured by Fusion UV Systems Inc., the resultant was irradiated with UV rays for 6 to 12 seconds at 30° C. at 60% of output, thereby obtaining a liquid crystal layer. The liquid crystal layer was coated with the coating solution A-2 shown in Table 1 at room temperature such that the thickness of the film obtained after drying became 5 μm. Subsequently, drying, heating, and UV irradiation were performed on the coating solution in the same manner as described above, thereby forming a second liquid crystal layer. By using each of the coating solutions A-3 to A-12 shown in Table 1, the third to twelfth liquid crystal layers were formed on the second liquid crystal layer through the same process as described above, thereby obtaining a circularly polarized light-separating layer.

A polarization filter of Example 4 was obtained in the same manner as in Example 1, except that the circularly polarized light-separating layer prepared as described above was used.

Example 5

The rubbing-processed surface of PET manufactured by FUJIFILM Corporation that had undergone rubbing processing was coated with the coating solution A-1 shown in Table 1 at room temperature by using a wire bar, such that the thickness of the film obtained after drying became 5 μm. The coating layer was dried for 30 seconds at room temperature and then heated for 2 minutes in an atmosphere with a temperature of 85° C. Thereafter, by using a D bulb (lamp of 90 mW/cm) manufactured by Fusion UV Systems Inc., the resultant was irradiated with UV rays for 6 to 12 seconds at 30° C. at 60% of output, thereby obtaining a liquid crystal layer. The liquid crystal layer was coated with the coating solution A-2 shown in Table 1 at room temperature such that the thickness of the film obtained after drying became 5 μm. Subsequently, drying, heating, and UV irradiation were performed on the coating solution in the same manner as described above, thereby forming a second liquid crystal layer. By using each of the coating solutions A-3 to A-14 shown in Table 1, the third to fourteenth liquid crystal layers were formed on the second liquid crystal layer through the same process as described above, thereby obtaining a circularly polarized light-separating layer.

A polarization filter of Example 5 was obtained in the same manner as in Example 1, except that the circularly polarized light-separating layer prepared as described above was used.

Example 6

A polarization filter of Example 6 was obtained in the same manner as in Example 2, except that the visible light absorption layer was not formed.

Comparative Example 1

A λ/4 phase difference layer was formed in the same manner as in Example 1, except that in the process of forming the λ/4 phase difference layer, mask exposure was not performed. Within the entire surface of the λ/4 phase difference layer, the liquid crystal was uniformly vertically aligned in a state in which the slow axis direction was orthogonal to the rubbing direction. The thickness of the λ/4 phase difference layer was 1.6 μm in both the exposed portion and the unexposed portion. Furthermore, Re (880) at 880 nm was 220 nm. A filter was prepared in the same manner as in Example 2, except that the aforementioned film was used as the λ/4 phase difference layer.

Comparative Example 2

A filter of Comparative example 2 was obtained in the same manner as in Comparative example 1, except that IR80 as a visible light absorption layer was not bonded to the liquid crystal layer.

Comparative Example 3

In Comparative example 3, only the circularly polarized light-separating layer prepared in Example 2 was used.

Comparative Example 4

A linear polarization film for near infrared manufactured by Edmund Optics Japan Ltd. was cut into two sheets of film having sides of 10 mm, and the absorption axes thereof were made orthogonal to each other. In a state in which the two sheets of film were in such an orientation relationship, the films were made to be adjacent to and come into contact with each other such that one side of one of the films became parallel to one side of the other film. In this state, the films were attached onto a glass plate.

TABLE 1

| Material (type) | Material name (manufacturer) | 800 Coating solution A-1 | 850 Coating solution A-2 | 900 Coating solution A-3 | 100 Coating solution A-4 | 1050 Coating solution A-5 |
|---|---|---|---|---|---|---|
| Liquid crystal compound | Compound 1 | 100 parts by mass | 100 parts by mass | 100 parts by mass | 100 parts by mass | 100 parts by mass |
| Polymerization initiator | Irg-819 (Ciba Specialty Chemicals Inc.) | 4 parts by mass | 4 parts by mass | 4 parts by mass | 4 parts by mass | 4 parts by mass |
| Alignment control agent | Compound 2 | 0.03 parts by mass | 0.03 parts by mass | 0.03 parts by mass | 0.03 parts by mass | 0.03 parts by mass |
| Chiral agent | LC-756 (BASF) | 3.7 parts by mass | 3.5 parts by mass | 3.3 parts by mass | 3.1 parts by mass | 2.9 parts by mass |
| Solvent | 2-Butanone (Wako Pure Chemical Industries, Ltd.) | Appropriately adjusted according to film thickness | Appropriately adjusted according to film thickness | Appropriately adjusted according to film thickness | Appropriately adjusted according to film thickness | Appropriately adjusted according to film thickness |

| Material (type) | Material name (manufacturer) | 1050 Coating solution A-6 | 1100 Coating solution A-7 | 1150 Coating solution A-8 | 1200 Coating solution A-9 | 1250 Coating solution A-10 |
|---|---|---|---|---|---|---|
| Liquid crystal compound | Compound 1 | 100 parts by mass | 100 parts by mass | 100 parts by mass | 100 parts by mass | 100 parts by mass |
| Polymerization initiator | Irg-819 (Ciba Specialty Chemicals Inc.) | 4 parts by mass | 4 parts by mass | 4 parts by mass | 4 parts by mass | 4 parts by mass |
| Alignment control agent | Compound 2 | 0.03 parts by mass | 0.03 parts by mass | 0.03 parts by mass | 0.03 parts by mass | 0.03 parts by mass |
| Chiral agent | LC-756 (BASF) | 2.8 parts by mass | 2.7 parts by mass | 2.6 parts by mass | 2.4 parts by mass | 2.3 parts by mass |
| Solvent | 2-Butanone (Wako Pure Chemical Industries, Ltd.) | Appropriately adjusted according to film thickness | Appropriately adjusted according to film thickness | Appropriately adjusted according to film thickness | Appropriately adjusted according to film thickness | Appropriately adjusted according to film thickness |

| Material (type) | Material name (manufacturer) | 1360 Coating solution A-11 | 1460 Coating solution A-12 | 1570 Coating solution A-13 | 1670 Coating solution A-14 |
|---|---|---|---|---|---|
| Liquid crystal compound | Compound 1 | 100 parts by mass | 100 parts by mass | 100 parts by mass | 100 parts by mass |
| Polymerization initiator | Irg-819 (Ciba Specialty Chemicals Inc.) | 4 parts by mass | 4 parts by mass | 4 parts by mass | 4 parts by mass |
| Alignment control agent | Compound 2 | 0.03 parts by mass | 0.03 parts by mass | 0.03 parts by mass | 0.03 parts by mass |
| Chiral agent | LC-756 (BASF) | 2.1 parts by mass | 2.0 parts by mass | 1.9 parts by mass | 1.8 parts by mass |
| Solvent | 2-Butartone (Wako Pure Chemical Industries, Ltd.) | Appropriately adjusted according to film thickness | Appropriately adjusted according to film thickness | Appropriately adjusted according to film thickness | Appropriately adjusted according to film thickness |

TABLE 2

| Coating solution (B) | | 400 | 450 | 500 | 550 |
|---|---|---|---|---|---|
| Material (type) | Material name (manufacturer) | Coating solution B-1 | Coating solution B-2 | Coating solution B-3 | Coating solution B-4 |
| Liquid crystal compound | Compound 1 | 100 parts by mass | 100 parts by mass | 100 parts by mass | 100 parts by mass |
| Polymerization initiator | Irg-819 (Ciba Specialty Chemicals Inc.) | 4 parts by mass | 4 parts by mass | 4 parts by mass | 4 parts by mass |
| Alignment control agent | Compound 2 | 0.03 parts by mass | 0.03 parts by mass | 0.03 parts by mass | 0.03 parts by mass |
| Chiral agent | LC 756 (BASF) | 7.6 parts by mass | 6.7 parts by mass | 6.0 parts by mass | 5.4 parts by mass |
| Solvent | 2-Butanone (Wako Pure | Appropriately adjusted | Appropriately adjusted | Appropriately adjusted | Appropriately adjusted |

TABLE 2-continued

| | Chemical Industries, Ltd.) | according to film thickness | according to film thickness | according to film thickness | according to film thickness |
|---|---|---|---|---|---|
| | | 600 | 650 | 700 | 750 |
| Material (type) | Material name (manufacturer) | Coating solution B-5 | Coating solution B-6 | Coating solution B-7 | Coating solution B-8 |
| Liquid crystal compound | Compound 1 | 100 parts by mass | 100 parts by mass | 100 parts by mass | 100 parts by mass |
| Polymerization initiator | Irg-819 (Ciba Sp Chemicals Inc.) | 4 parts by mass | 4 parts by mass | 4 parts by mass | 4 parts by mass |
| Alignment control agent | Compound 2 | 0.03 parts by mass | 0.03 parts by mass | 0.03 parts by mass | 0.03 parts by mass |
| Chiral agent | LC-756 (BASF) | 5.0 parts by mass | 4.6 parts by mass | 4.2 parts by mass | 3.9 parts by mass |
| Solvent | 2-Butanone (Wako Pure Chemical Industries, Ltd.) | Appropriately adjusted according to film thickness | Appropriately adjusted according to film thickness | Appropriately adjusted according to film thickness | Appropriately adjusted according to film thickness |
| | | 400 | 450 | 500 | 550 |
| Material (type) | Material name (manufacturer) | Coating solution B-9 | Coating solution B-10 | Coating solution B-11 | Coating solution B-12 |
| Liquid crystal compound | Compound 1 | 100 parts by mass | 100 parts by mass | 100 parts by mass | 100 parts by mass |
| Polymerization initiator | Irg-819 (Ciba Specialty Chemicals Inc.) | 4 parts by mass | 4 parts by mass | 4 parts by mass | 4 parts by mass |
| Alignment control agent | Compound 2 | 0.03 parts by mass | 0.03 parts by mass | 0.03 parts by mass | 0.03 parts by mass |
| Chiral agent | Compound 3 | 12.5 parts by mass | 11.0 parts by mass | 9.8 parts by mass | 8.8 parts by mass |
| Solvent | 2-Butanone (Wako Pure Chemical Industries, Ltd.) | Appropriately adjusted according to film thickness | Appropriately adjusted according to film thickness | Appropriately adjusted according to film thickness | Appropriately adjusted according to film thickness |
| | | 600 | 650 | 700 | 750 |
| Material (type) | Material name (manufacturer) | Coating solution B-13 | Coating solution B-14 | Coating solution B-15 | Coating solution B-16 |
| Liquid crystal compound | Compound 1 | 100 parts by mass | 100 parts by mass | 100 parts by mass | 100 parts by mass |
| Polymerization initiator | Irg-819 (Ciba Specialty Chemicals Inc.) | 4 parts by mass | 4 parts by mass | 4 parts by mass | 4 parts by mass |
| Alignment control agent | Compound 2 | 0.03 part by mass | 0.03 part by mass | 0.03 part by mass | 0.03 part by mass |
| Chiral agent | Compound 3 | 8.0 parts by mass | 7.3 parts by mass | 6.8 parts by mass | 6.3 parts by mass |
| Solvent | 2-Butanone (Wako Pure Chemical Industries, Ltd.) | Appropriately adjusted according to film thickness | Appropriately adjusted according to film thickness | Appropriately adjusted according to film thickness | Appropriately adjusted according to film thickness |

The numbers listed outside the frames of Tables 1 and 2 signify the central reflection wavelength (nm) of circularly polarized light reflected by the cholesteric liquid crystal layer formed of the coating solution.

Compound 1

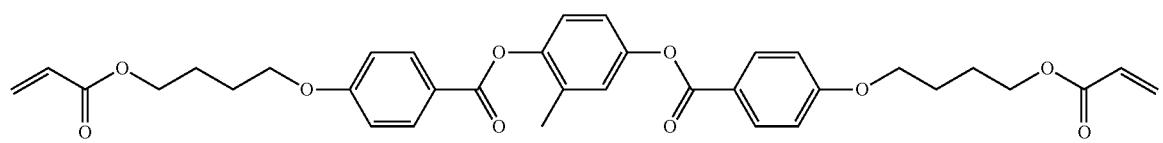

Compound 2

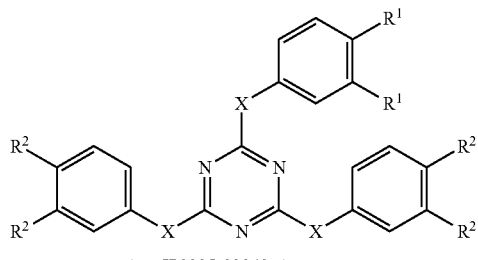

(see JP2005-99248A)

| R¹ | R² | X |
|---|---|---|
| $O(CH_2)_2O(CH_2)_2(CF_2)_6F$ | $O(CH_2)_2O(CH_2)_2(CF_2)_6F$ | NH |

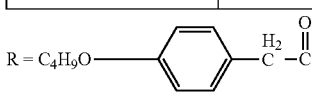

Compound 3

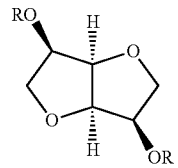

Measurement Method

Figure 2:
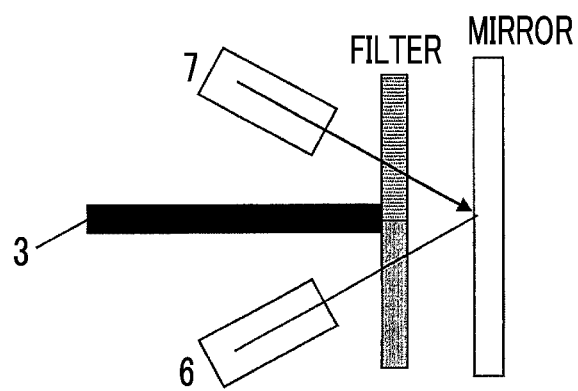
FIG. 2 is a view schematically showing the arrangement of a filter, a light source, a light-receiving element, and a mirror used in examples.

The filters prepared as described above, a mirror, a light source (KED 880S4 manufactured by Kyosemi Corporation.), and a light-receiving element (KS 1364 manufactured by SHINKO DENSHI CO., LTD.) were arranged as shown in FIG. 2. Herein, the film was disposed such that the light source, the circularly polarized light-separating layer, and the phase difference layer (λ/4 phase difference layer) were arranged in this order, and the light-receiving element, the circularly polarized light-separating layer, and the phase difference layer (λ/4 phase difference layer) were arranged in this order. Through the first phase difference region of the λ/4 phase difference layer of the film, the mirror was irradiated with unpolarized light from the light source that was centered at a wavelength of 880 nm. The light, which was reflected from the mirror and then transmitted through the second phase difference region of the λ/4 phase difference layer of the film, was detected by the light-receiving element, and the amount of the detected light was used for evaluation. On the assumption that the amount of light measured without the film was 100, the amount of light measured after installing the film was corrected and used for evaluation. In a darkroom, the amount of light was measured in a state in which external light was completely blocked. Furthermore, in a bright room, the amount of light was measured in a state in which an incandescent lamp was turned on. The smaller the amount of the measured light, the higher the effect of the filter. The evaluation criteria were as follows. Table 3 shows the results and the transmittance of light centered at the control wavelength band of the filters prepared as described above.

AA: 0 to 3
A: 3 to 10
B: 10 to 25
C: 25 to 50
D: equal to or greater than 50 and less than 100
E: equal to or greater than 100

TABLE 3

| | Circularly polarized light-separating layer | | | Phase difference layer | | Visible light blocking layer | | | | Transmittance of light centered at control wavelength of polarization filter % | Measurement result | |
|---|---|---|---|---|---|---|---|---|---|---|---|---|
| | Short wave nm | Long wave nm | Wavelength band nm | Type of phase difference | Slow axis | Type of light blocking | Short wave nm | Long wave nm | Wavelength band nm | | Dark-room | Bright room |
| Example 1 | 850 | 910 | 60 | DLC | Slow axes orthogonal to each other | Absorption layer | 380 | 780 | 400 | 46 | A | A |
| Example 2 | 800 | 910 | 110 | DLC | Slow axes orthogonal to each other | Absorption layer | 380 | 780 | 400 | 46 | AA | AA |
| Example 3 | 800 | 1200 | 400 | DLC | Slow axes orthogonal to each other | Reflection layer | 380 | 780 | 400 | 46 | AA | AA |
| Example 4 | 800 | 1500 | 700 | DLC | Slow axes orthogonal to each other | Absorption layer | 380 | 780 | 400 | 46 | A | A |
| Example 5 | 800 | 1700 | 900 | DLC | Slow axes orthogonal to each other | Absorption layer | 380 | 780 | 400 | 46 | B | B |
| Example 6 | 800 | 910 | 110 | DLC | Slow axes orthogonal to each other | N/A | — | — | — | 46 | AA | C |

TABLE 3-continued

| | Circularly polarized light-separating layer | | | Phase difference layer | | Visible light blocking layer | | | | Transmittance of light centered at control wavelength | Measurement result | |
|---|---|---|---|---|---|---|---|---|---|---|---|---|
| | Short wave nm | Long wave nm | Wavelength band nm | Type of phase difference | Slow axis | Type of light blocking | Short wave nm | Long wave nm | Wavelength band nm | of polarization filter % | Dark-room | Bright room |
| Comparative example 1 | 800 | 910 | 110 | DLC | Slow axis directions are the same | Absorption layer | 380 | 780 | 400 | 46 | E | E |
| Comparative example 2 | 800 | 910 | 110 | DLC | Slow axis directions are the same | N/A | — | — | — | 46 | E | E |
| Comparative example 3 | 800 | 910 | 110 | N/A | — | Absorption layer | 380 | 780 | 400 | 46 | A | A |
| Comparative example 4 | Linear polarization plates crossing each other | | | N/A | — | Absorption layer | 380 | 780 | 400 | 30 | A | A |

EXPLANATION OF REFERENCES

1: circularly polarized light-separating layer
2: λ/4 phase difference layer
3: light-blocking layer (light absorption layer)
6: light-receiving element
7: light source

What is claimed is:

1. A sensor system comprising a light source, a light-receiving element, and a polarization filter;
the polarization filter comprising:
a circularly polarized light-separating layer having a cholesteric liquid crystalline phase fixed therein and
a λ/4 phase difference layer for light in a specific wavelength band disposed on one of the surfaces of the circularly polarized light-separating layer,
wherein the circularly polarized light-separating layer is a layer which selectively transmits one of the left-hand circularly polarized light and the right-hand circularly polarized light in the specific wavelength band,
the λ/4 phase difference layer comprises a first phase difference region and a second phase difference region of which slow axis directions are orthogonal to each other,
the light source, the circularly polarized light-separating layer, and the λ/4 phase difference layer are arranged in this order, and
the light-receiving element, the circularly polarized light-separating layer, and the λ/4 phase difference layer are arranged in this order.

2. The sensor system according to claim 1,
wherein a light source emits light having a wavelength in the specific wavelength band; and
a light-receiving element can sense the light having a wavelength in the specific wavelength band.

3. The sensor system according to claim 1, wherein light from the light source is irradiated through the first phase difference region and light to the light-receiving element transmits through the second phase difference region.

4. The sensor system according to claim 1,
wherein the λ/4 phase difference layer comes into direct contact with the circularly polarized light-separating layer or directly adheres to the circularly polarized light-separating layer through an adhesive layer.

5. The sensor system according to claim 1,
wherein the specific wavelength band is a wavelength band having a width of equal to or greater than 50 nm within a wavelength range of 800 nm to 1,500 nm.

6. The sensor system according to claim 1, further comprising:
a light-blocking layer which blocks light in at least a portion of a wavelength band other than the specific wavelength band.

7. The sensor system according to claim 6,
wherein the light-blocking layer blocks light in a wavelength band having a width of equal to or greater than 50 nm within a wavelength of 380 nm to 780 nm.

8. The sensor system according to claim 1,
wherein the λ/4 phase difference layer is a layer formed of a liquid crystal composition containing a disk-like liquid crystal compound.

9. The sensor system according to claim 8,
wherein the polarization filter comprises a patterned alignment film, and
the patterned alignment film and the λ/4 phase difference layer are in direct contact.

10. The sensor system according to claim 9,
wherein the patterned alignment film is a photoalignment film on which mask exposure is performed.

11. The sensor system according to claim 1,
wherein the polarization filter comprises a patterned alignment film, and
the patterned alignment film and the λ/4 phase difference layer are in direct contact.

12. The sensor system according to claim 11,
wherein the patterned alignment film is a photoalignment film on which mask exposure is performed.

13. The sensor system according to claim 12,
wherein the photoalignment film comprises a photoacid generator.

14. The sensor system according to claim 1,
wherein the first phase difference region and the second phase difference region are continuous regions of which the slow axis directions are the same.

15. A polarization filter for the use in the sensor system according to claim 1, comprising a patterned alignment film,
wherein the patterned alignment film and the λ/4 phase difference layer are in direct contact.

16. The polarization filter according to claim 15,
wherein the λ/4 phase difference layer is a layer formed from a liquid crystal composition comprising a discotic liquid crystal compound.

17. The polarization filter according to claim 15,
wherein the patterned alignment film is a photoalignment film on which mask exposure is performed.

18. The polarization filter according to claim 17,
wherein the λ/4 phase difference layer is a layer formed from a liquid crystal composition comprising a discotic liquid crystal compound.

19. The polarization filter according to claim 17
wherein the photoalignment film comprises a photoacid generator.

20. The polarization filter according to claim 19
wherein the photoacid generator is a photoacid generator as follows

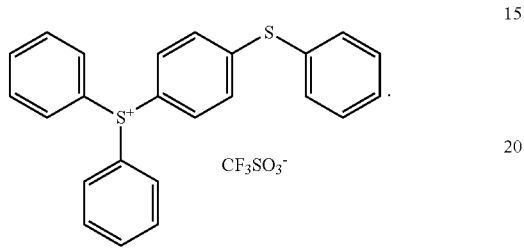

* * * * *